United States Patent
Inomata et al.

(10) Patent No.: US 7,054,357 B1
(45) Date of Patent: May 30, 2006

(54) ERROR RATE ESTIMATING DEVICE, METHOD, AND INFORMATION RECORDING MEDIUM

(75) Inventors: Atsushi Inomata, Tokyo (JP); Tamotsu Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/869,897

(22) PCT Filed: Jan. 5, 2000

(86) PCT No.: PCT/JP00/00013

§ 371 (c)(1),
(2), (4) Date: Oct. 15, 2001

(87) PCT Pub. No.: WO00/41353

PCT Pub. Date: Jul. 13, 2000

(30) Foreign Application Priority Data

Jan. 7, 1999 (JP) ..................... 11/1790

(51) Int. Cl.
*H04B 17/00* (2006.01)

(52) U.S. Cl. ............... 375/225; 375/341; 714/704
(58) Field of Classification Search .............. 375/225, 375/226, 265, 262, 320, 322, 323, 341; 714/704

See application file for complete search history.

(56) References Cited

U.S. PATENT DOCUMENTS

| | | | | |
|---|---|---|---|---|
| 4,802,174 A | * | 1/1989 | Hiraiwa et al. | ............. 714/789 |
| 5,463,403 A | * | 10/1995 | Walker et al. | ............. 342/359 |
| 6,356,595 B1 | * | 3/2002 | Czaja et al. | ................ 375/262 |

FOREIGN PATENT DOCUMENTS

| | | |
|---|---|---|
| JP | 58-206252 | 12/1983 |
| JP | 02-113753 | 4/1990 |
| JP | 03-254256 | 11/1991 |
| JP | 4-123525 | 4/1992 |
| JP | 6-204897 | 7/1994 |
| JP | 7-66736 | 3/1995 |
| JP | 08-288967 | 11/1996 |
| JP | 9-135177 | 5/1997 |
| WO | WO 98/18209 | 4/1998 |

* cited by examiner

*Primary Examiner*—Kevin Kim
(74) *Attorney, Agent, or Firm*—Finnegan, Henderson, Farabow, Garrett & Dunner, L.L.P.

(57) ABSTRACT

To reduce the size of the device for judging the error rate on a channel and reducing the amount of processing, a normalization accumulator cumulatively adds the number of times that normalization is performed within a predetermined time in an ACS circuit calculating a state metric. The table stores a table establishing correspondence between the number of times of normalization cumulatively added by the normalization accumulator. The table uses the stored table to judge and output an error rate corresponding to the input cumulative number of times of normalization.

10 Claims, 29 Drawing Sheets

FIG.2
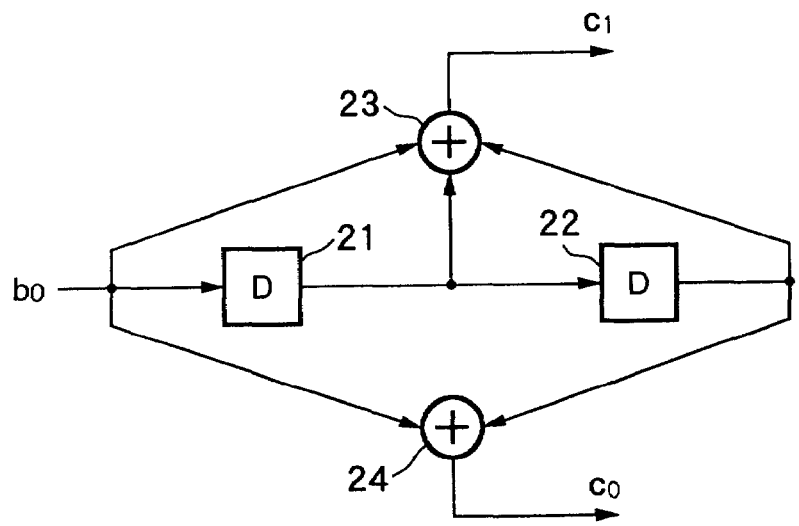
CODER 3
FIG.3A
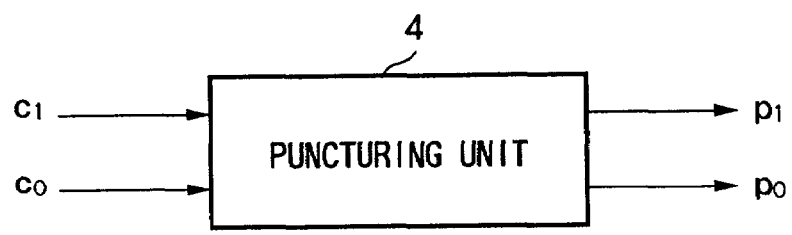
FIG.3B
| $c_1$ | 1 | 1 | 0 |
| $c_0$ | 1 | 0 | 1 |

FIG.4A INPUT

| $c_1$ | $X_1$ | $X_2$ | $X_3$ | $X_4$ | $X_5$ | $X_6$ |
|---|---|---|---|---|---|---|
| $c_0$ | $Y_1$ | $Y_2$ | $Y_3$ | $Y_4$ | $Y_5$ | $Y_6$ |

FIG.4B OUTPUT

| $p_1$ | $X_1$ | $Y_3$ | $X_4$ | $Y_6$ |
|---|---|---|---|---|
| $p_0$ | $Y_1$ | $X_2$ | $Y_4$ | $X_5$ |

FIG.7A INPUT

FIG.7B OUTPUT

MONITORING CIRCUIT 11

ACCUMULATOR 61

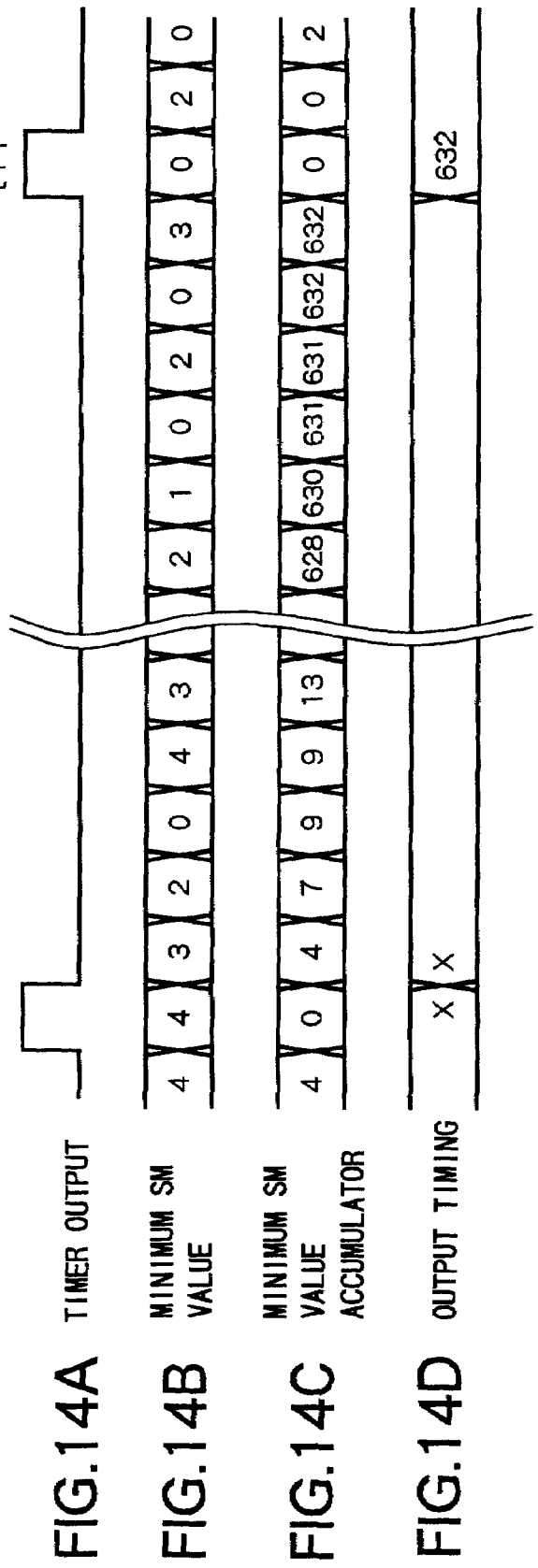

FIG.15A

| QPSK R = 1/2 | |
|---|---|
| ROM | |
| COUNTER VALUE | C/N |
| EQUAL OR MORE 22720 | 3.00 |
| EQUAL OR MORE 22080 LESS THAN 22720 | 2.50 |
| EQUAL OR MORE 21440 LESS THAN 22080 | 2.00 |
| LESS THAN 21440 | 1.50 |

FIG.15B

| QPSK R = 3/4 | |
|---|---|
| ROM | |
| COUNTER VALUE | C/N |
| EQUAL OR MORE 36160 | 2.20 |
| EQUAL OR MORE 35520 LESS THAN 36160 | 1.50 |
| EQUAL OR MORE 34880 LESS THAN 35520 | 1.00 |
| LESS THAN 34880 | 0.85 |

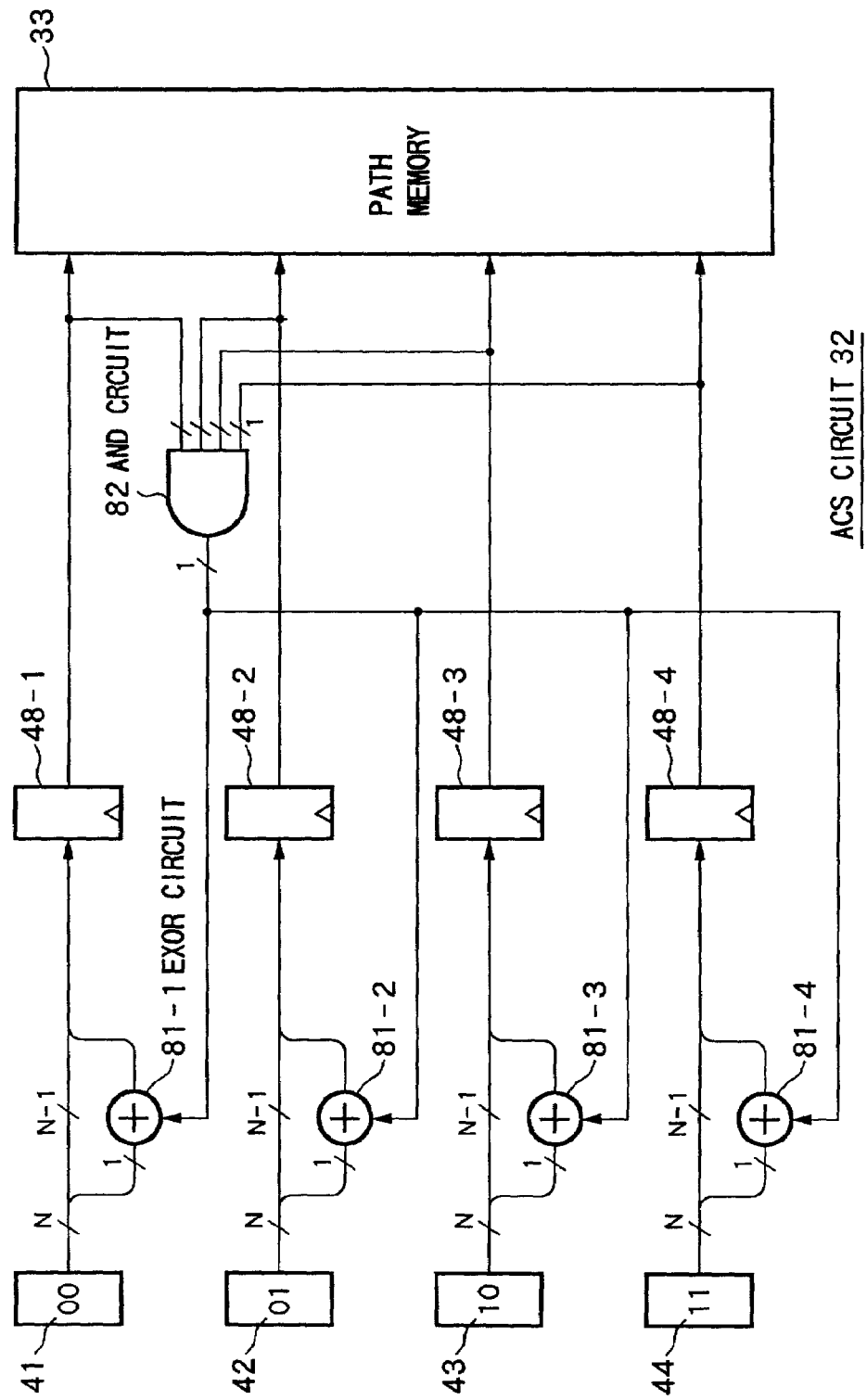

MONITORING CIRCUIT 11

NORMALIZATION ACCUMULATOR 91

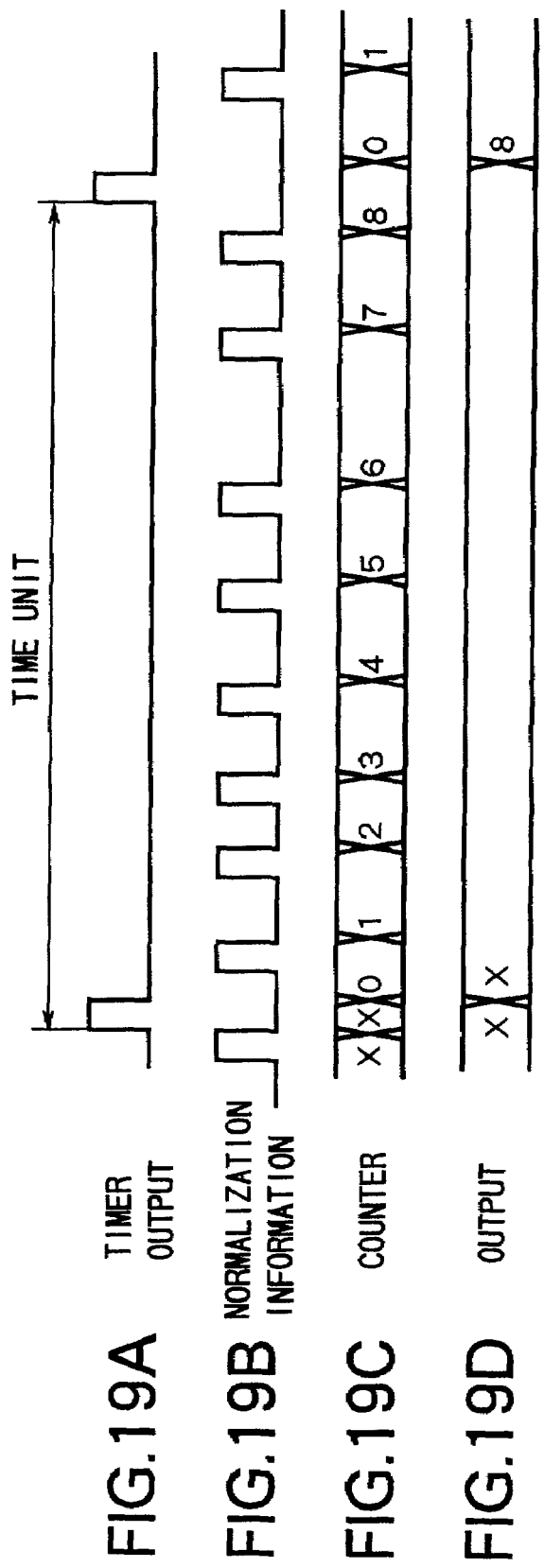

FIG.20A

| QPSK R = 1/2 | |
|---|---|
| COUNTER VALUE | BER |
| 355 OR MORE | $0.50 \times 10^{-3}$ |
| 345 TO 354 | $1.90 \times 10^{-3}$ |
| 335 TO 344 | $0.80 \times 10^{-2}$ |
| 334 OR LESS | $0.20 \times 10^{-1}$ |

FIG.20B

| QPSK R = 3/4 | |
|---|---|
| COUNTER VALUE | BER |
| 565 OR MORE | $4.80 \times 10^{-3}$ |
| 555 TO 564 | $3.20 \times 10^{-2}$ |
| 545 TO 554 | $1.00 \times 10^{-1}$ |
| 544 OR LESS | $1.90 \times 10^{-1}$ |

FIG.21A

| QPSK R = 1/2 ||
|---|---|
| COUNTER VALUE | C/N |
| 355 OR MORE | 3.00 |
| 345 TO 354 | 2.50 |
| 335 TO 344 | 2.00 |
| 334 OR LESS | 1.50 |

FIG.21B

| QPSK R = 3/4 ||
|---|---|
| COUNTER VALUE | C/N |
| 565 OR MORE | 2.20 |
| 555 TO 564 | 1.50 |
| 545 TO 554 | 1.00 |
| 544 OR LESS | 0.85 |

MONITORING CIRCUIT 11

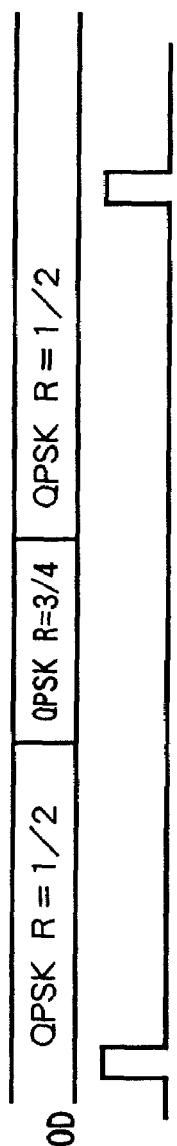
FIG.28A CODING OR MODULATING METHOD
FIG.28B TIMER OUTPUT
FIG.28C CODING RATE INFORMATION
FIG.28D NORMALIZATION INFORMATION
FIG.28E COUNTER
FIG.28F OUTPUT

FIG.33

| ESTIMATED VALUE OF C/N IN QPSK TRANSMISSION AT R=1/2 | WEIGHTING(QPSK R=1/2) | WEIGHTING(QPSK R=3/4) |
|---|---|---|
| FROM 2.0[dB] TO 3.0[dB] | 1.0 | 0.0 |
| FROM 1.5[dB] TO 2.0[dB] | 0.5 | 0.5 |
| 1.5[dB] OR LESS | 0.0 | 1.0 |

TABLE

FIG.34

| CODING RATE OF QPSK R=3/4 | WEIGHTING (QPSK R=1/2) | WEIGHTING (QPSK R=3/4) |
|---|---|---|
| EQUAL OR MORE 565 | 0.0 | 1.0 |
| EQUAL OR MORE 565 LESS THAN 565 | 0.5 | 0.5 |
| LESS THAN 555 | 1.0 | 0.0 |

TABLE

MONITORING CIRCUIT 11

FIG.37

| ESTIMATED VALUE OF C/N IN QPSK TRANSMISSION AT R=3/4 | WEIGHTING(QPSK R=1/2) | WEIGHTING(QPSK R=3/4) |
|---|---|---|
| 2.20[dB] OR MORE | 1.0 | 0.0 |
| FROM 1.5[dB] TO 2.20[dB] | 0.5 | 0.5 |
| FROM 0.8[dB] TO 1.5[dB] | 0.0 | 1.0 |

TABLE

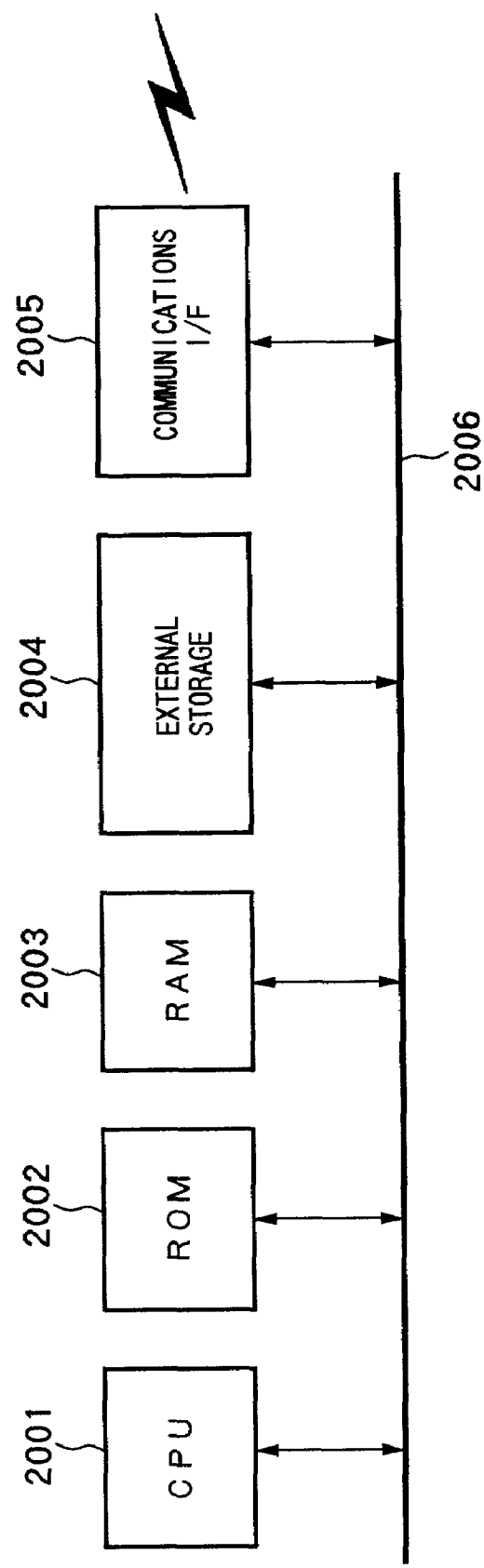

US 7,054,357 B1

ERROR RATE ESTIMATING DEVICE, METHOD, AND INFORMATION RECORDING MEDIUM

TECHNICAL FIELD

The present invention relates to an error rate estimating device and a receiver using the error rate estimating device, an error rate estimating method and a receiving method using the error rate estimating method, and an information recording medium, more particularly relates to an error rate estimating device and method for determining an error rate on a channel using the number of times of normalization performed by a circuit finding a state metric, a receiver using the error rate estimating device, an error rate estimating method and a receiving method using the error rate estimating method, and an information recording medium.

BACKGROUND ART

At the present, in Japan, provision of a digital broadcasting service using a successor to the BS4 scheduled to be launched as a broadcasting satellite is being discussed at the Radio Regulatory Council. In this digital broadcasting service, 8 SPK (Phase Shift Keying), QPSK (Quadrature PSK), and BPSK (Binary PSK) are defined as channel coding systems.

FIG. 1 is a block diagram of an example of the configuration of a transmitter and a receiver. The transmitter 1 is comprised of a video, audio, or other information source 2, a coder 3, a puncturing unit 4, and a mapping unit 5. The information source 2 outputs data to be coded and transmitted to the coder 3. The coder 3 performs trellis coding on input 1-bit data by the coding rate R=1/2 and outputs it to the puncturing unit 4 as a 2-bit coded word. The puncturing unit 4 punctures the input 2-bit data and outputs it to the mapping unit 5. The mapping unit 5 assigns the input 2-bit coded word to one signal point among four signal points shown in FIG. 5 by an quadrature modulation system and outputs an I-signal and Q-signal of the signal point to a channel 6.

A receiver 7 is comprised of a bit insertion unit 8, a decoder 9, and decoded information 10. The bit insertion unit 8 inserts bits into the received signals (I, Q) input via the channel 6 and outputs them to the decoder 9. The decoder 9 performs trellis decoding on the input signal and outputs it as decoded information 10. The decoded information 10 shows decoded data. An image and sound can be obtained by reproducing the decoded information 10 with a not shown reproducing apparatus.

Information of the state metric output from the decoder 9 is supplied to a monitoring circuit 11. The monitoring circuit 11 determines an error rate on the channel 6 and outputs the information as error rate information 12. The error rate information 12, for instance, is used as data when adjusting the orientation of the antenna for receiving the data in a direction giving the lowest error rate.

FIG. 2 is a block diagram showing the configuration of a coder 3. The coder 3 is a convolutional coder. An input 1-bit data $b_0$ is coded to 2-bit data ($c_1$, $c_0$) and output. The output 2-bit data $c_1$, $c_0$ is generated by calculating the data $b_0$ by a processor comprising delay circuits 21 and 22 and exclusive OR circuits 23 and 24.

That is, the data $b_0$ is input to the delay circuit 21, the exclusive OR circuit 23, and the exclusive OR circuit 24. The data $b_0$ input to the delay circuit 21 is delayed by one unit time and output to the delay circuit 22 and the exclusive OR circuit 23. The data input to the delay circuit 22 is further delayed for one unit time and output to the exclusive OR circuits 23 and 24. The exclusive OR circuit 23 calculates the exclusive OR of the three bits of data, that is, the data $b_0$ currently input in the coder 3, the data input to the coder 3 one time unit before, and further the data input to the coder 3 two time units before, to generate the output data $c_1$.

The exclusive OR circuit 24 calculates the exclusive OR of the data $b_0$ currently input in the coder 3 and the data input to the coder 3 two time unit before to generate an output data $c_0$.

The output data ($c_1$, $c_0$) output from the coder 3 are input to the puncturing unit 4 in this way. The puncturing unit 4 outputs the input data to the mapping unit 5 as is when outputting the data of the coding rate R=1/2 to the channel 6 and punctures the input data and outputs it to the mapping unit 5 when outputting data of the coding rate R=3/4 to the channel 6.

FIGS. 3A and 3B are views for explaining the puncturing. As shown in FIG. 3A, the puncturing unit 4 punctures the input data ($c_1$, $c_0$) in accordance with the puncturing table shown in FIG. 3B and outputs the data ($p_1$, $p_0$).

In the puncturing table shown in FIG. 3B, "1" shows the input data output as the data $p_0$ or data $p_1$ and "0" shows the input data not output (erased). For instance, the data shown in FIG. 4B is output when the data shown in FIG. 4A is input.

That is, as shown in FIG. 4A, when data $X_1$ to $X_6$ are input as the input data $c_1$ and the data $Y_1$ to $Y_6$ are input as the input data $c_0$ to the puncturing unit 4, since these are input in the order of the data $c_0$, $c_1$, when the data are sequentially input in the order of $Y_1$, $X_1$, $Y_2$, $X_2$, ..., $Y_6$, $X_6$ to the puncturing unit 4, as shown in FIG. 4B, the data $X_1$, $Y_3$, $X_4$, and $Y_6$ are output as the output data $p_1$ and the data $Y_1$, $X_2$, $Y_4$, and $X_5$ are output as the output data $p_0$. Note that since the output data is output in the order of the data $p_0$, $p_1$, the data is output from the puncturing unit 4 in the order of $Y_1$, $X_1$, $X_2$, $Y_3$, $Y_4$, $X_4$, $X_5$, and $Y_6$.

The input data $Y_1$, $X_1$ are output as output data $p_0$, $p_1$ as is since they correspond to positions of the value 1 of the puncturing table, but the input data $Y_2$ is deleted since it corresponds to a position of a value 0 of the puncturing table. The next output data $X_2$ (corresponding to a position of a value 1 of the puncturing table) is output as the data $p_0$. Below, in the same way, data corresponding to a position of a value 0 of the puncturing table are deleted and data corresponding to a position of a value 1 of the puncturing table are output.

The data output from the puncturing unit 4 in this way are mapped onto the signal points in the quadrature coordinate system based on the I-axis and Q-axis as shown in FIG. 5 by the mapping unit 5. The signal points are arranged at equal intervals 90 degrees apart. "$p_1$" shown in FIGS. 3A and 3B is the MSB (most significant bit) in the signal point assignment, while "$p_0$" is the LSB (least significant bit) in the signal point assignment. That is, a signal point assignment may be expressed as ($p_1$, $p_0$).

The data mapped by the mapping unit 5 is input to the bit insertion unit 8 of the receiver 7 through the channel 6. FIGS. 6A and 6B are views explaining bit insertion. Bit insertion is processing opposite to the puncturing performed in the puncturing unit 4, that is, processing for outputting received data as is to the decoder 9 when receiving data of the coding rate R=1/2 and inserting deleted data (bits) when receiving data of the coding rate R=3/4.

As shown in FIG. 6A, the bit insertion unit 8 inserts bits in the data ($p'_1$, $p'_0$) from the transmitter 1 through the channel 6 in accordance with the depuncturing table shown in FIG. 6B and outputs the output data ($c'_1$, $c'_0$). A value 1 of the depuncturing table shown in FIG. 6B indicates to output the input data as is, while the value 0 indicates to insert 0 (insert a bit).

When for example input data shown in FIG. 7A (data output from the puncturing unit 4 and shown in FIG. 4B) is input to the bit insertion unit 8, the data shown in FIG. 7B is output. The data transmitted from the transmitter 1 is in the order of the data $p_0$, $p_1$, so the order of input into the bit insertion unit 8 of the receiver 7 also becomes the data $p'_0$, $p'_1$. Further, the order of the data output from the bit inserted unit 8 becomes the data $c'_0$, $c'_1$.

Note that the data $p'_0$, $p'_1$ show the data $p_0$, $p_1$ output from the transmitter having the possibility of generation of error due to the effect of noise or distortion in the channel 6.

Therefore, the data $X_2$ input as the input data $p'_0$ is data corresponding to a position of a value 0 of the depuncturing table, so is output as the data $c'_0$ in a form with 0 inserted instead of the input data $X_2$. The data $X_2$ is output as the data $c'_1$. In this way, input data positioned at a value 0 is output with 0 inserted.

Data with a bit inserted by the bit insertion unit 8 in this way is output to the decoder 9.

FIG. 8 is a block diagram of the inner configuration of the decoder 9. The decoder 9 is comprised of a branch metric generator 31 (hereinafter referred to as a "BM generator 31"), an add, compare, and select (ACS) circuit 32, and a path memory 33. The signal input to the decoder 9 is first input to the BM generator 31 calculating the square of the Euclidean distance from a received signal point with the noise and distortion of the channel to a signal point to originally be received and generating the same as a branch metric. The branch metrics generated at the BM generator 31 are cumulatively added and compared in accordance with a convolutional coding trellis by the ACS circuit 32 to calculate the state metric of each state.

FIG. 9 is a trellis transition diagram for explaining the calculation of a state metric performed by the ACS circuit 32. As the paths in the state 00 at the time t+1, two paths may be considered: the path of the case where the branch metric BM00 is selected at the state 00 at the time t and the path of the case where the branch metric BM11 is selected at a state 01 at the time t. The value obtained by adding the value of the branch metric BM00 to the state metric of the state 00 at the time t and the value obtained by adding the value of the branch metric BM11 to the state metric of the state 01 at the time t are compared and the path with the smaller value is used as the state metric of the state 00 at the time t+1.

Similarly, the state metrics of the states 01, 10, and 11 at the time t+1 are calculated.

The ACS circuit 32, as described above, controls the path memory 33 while inferring the state transition at the coding side (transmission side). If there is no noise or distortion on the channel, the input signal matches with the original transmission signal point, so the BM generator 31 generates 0 for the branch metric relating to the transmission signal point and the square of the distance between the signal points for other branch metrics. Therefore, when these branch metrics are cumulatively added in accordance with the state transition diagram and the state metric calculated in the ACS circuit 32, the state metric remains 0 for the original path, but the state metric is a large value for other paths, so the transmission signal sequence can be inferred from this.

Here, consider the case where the input signal includes noise. Since the input signal is comprised of the original transmission signal point plus noise, the branch metric relating to the original transmission signal point does not always become 0 and has indefiniteness depending on the noise power. In the same way, for other branch metrics as well, the square of the distance between signal points also has indefiniteness depending on the noise power.

However, when the noise power is small, the ACS circuit 32 cumulatively adds the branch metrics in accordance with the state transition diagram and calculates the state metric. Since the state metric is a small value for the original path, but the state metric has a large value for other passes, it is possible to estimate the transmission signal sequence.

FIG. 10 is a block diagram of the configuration of the ACS circuit 32. The ACS circuit 32 is comprised of the state 00 generating unit 41, state 01 generating unit 42, state 10 generating unit 43, and state 11 generating unit 44 for finding the state metrics for the states 00, 01, 10, and 11. The state 00 generating unit 41 is comprised of adders 45-1 and 46-1 and a selector 47-1. The state metric of the state 00 and branch metric BM00 at the time t are input to the adder 45-1 and added. In the same way, the state metric of the state 01 and branch metric BM11 at the time t are input to the adder 46-1 and added.

The selector 47-1 compares the values input from the adder 45-1 and the adder 46-1 and outputs the smaller value to a register 48-1. The register 48-1 stores the value of the state metric of the state 00 at the time t+1, output from the selector 47-1, as a value at the time when finding the state metric of the state 00 at the next time t+2, and outputs it to the path memory 33.

The state 01 generating unit 42 is comprised of the adders 45-2 and 46-2 and the selector 47-2. The state metric of the state 10 and branch metric BM10 at the time t are input to the adder 45-2 and added. The state metric of the state 11 and the branch metric BM01 at the time t are input to the adder 46-2 and added. The selector 47-2 compares the values input from the adder 45-2 and the adder 46-2 and outputs the smaller value to a register 48-2. The register 48-2 stores the value of the state metric of the state 01 at the time t+1, output from the selector 47-2, as a value at the time when finding the state metric of the state 01 at the next time t+2, and outputs it to the path memory 33.

The state 10 generating unit 43 is comprised of the adders 45-3 and 46-3 and the selector 47-3. The state metric of the state 00 and the branch metric BM11 at the time t are input to the adder 45-3 and added. The state metric of the state 01 and the branch metric BM00 at the time t are input to the adder 46-3 and added. The selector 47-3 compares the values input from the adder 45-1 and the adder 46-3 and outputs the smaller value to a register 48-3. The register 48-3 stores the value of the state metric of the state 10 at the time t+1, output from the selector 47-3, as a value at the time when finding the state metric of the state 10 at the next time t+2, and outputs it to the path memory 33.

The state 11 generating unit 44 is comprised of the adders 45-3 and 46-3 and the selector 47-4. The state metric of the state 10 and the branch metric BM01 at the time t are input to the adder 45-4 and added, while the state metric of the state 11 and branch metric BM10 at the time t are input to the adder 46-4 and added. The selector 47-4 compares the values input from the adder 45-1 and the adder 46-4 and outputs the smaller value to a register 48-4. The register 48-4 stores a value of the state metric of the state 11 at the time t+1, output from the selector 47-4, as the value at the time when finding the state metric of the state 11 at the next time t+2, and outputs it to the path memory 33.

However, the bit length in the above ACS circuit 32 is limited, so overflow occurs due to the addition of the branch metrics, therefore processing is necessary to prevent overflow from occurring. The processing to prevent overflow from occurring in this way is called "normalization". FIG. 11 shows the configuration of the ACS circuit 32 for calculating a state metric while performing normalization.

In the configuration of the ACS circuit 32 shown in FIG. 11, the value output from the state 00 generating unit 41 is supplied to the register 48-1 through the subtracter 51-1, the value output from the state 01 generating unit 42 is supplied to the register 48-2 through the subtracter 51-2, the value output from the state 10 generating unit 43 is supplied to the register 48-3 through the subtracter 51-3, and the value output from the state 11 generating unit 44 is supplied to the register 48-4 through the subtracter 51-4. The values output from the registers 48-1 to 48-4 are input to the path memory 33 and the minimum value processor 52.

The minimum value processor 52 calculates the minimum value of the state metrics output from the registers 48-1 to 48-4 and outputs the value to the subtracters 51-1 to 51-4, the path memory 33, and the monitoring circuit 11. The subtracters 51-1 to 51-4 subtract the value input from the minimum value processor 52 from the values input from the state generating units 41 to 44 respectively corresponding to the subtracters 51-1 to 51-4. In this way, normalization is carried out.

FIG. 12 is a block diagram of the configuration of the monitoring circuit 11. The monitoring circuit 11 is comprised of an accumulator 61 and a table 62. The accumulator 61 cumulatively adds the values of the minimum state metric for a predetermined time and outputs the cumulative total to the table 62. The table 62 is comprised of a ROM (read only memory) and the like and determines the noise of the channel by using a table establishing correspondence between a value output from the accumulator 61 and noise.

FIG. 13 is a block diagram of the configuration of the accumulator 61. A timer 71 generates a pulse at a predetermined cycle and supplies the pulse to a minimum SM (status metric) value accumulator 72. The minimum SM value accumulator 72 receives as input the minimum value of the state metric output from the minimum value processor 52 (FIG. 11) and the value output and fed back from the minimum SM value accumulator 72. The value output from the minimum SM value accumulator 72 and the pulse generated at the timer 71 are supplied to the register 73.

The operation of the accumulator 61 shown in FIG. 13 will be explained referring to the timing chart in FIGS. 14A to 14D. The pulse generated by the timer 71 (FIG. 14A) is a reset pulse for resetting the cumulative total of the minimum SM values. The minimum SM value accumulator 72 cumulatively adds the minimum SM values input between the pulse generated at a predetermined time t and the pulse generated at the next time t+1 and outputs the value to the register 73.

When the minimum SM value accumulator 72 receives as input a value such as shown in FIG. 14B as the minimum SM value, a cumulative value shown in FIG. 14C is output. That is, when receiving as input a pulse from the timer 71 at the time t, the minimum SM value accumulator 72 resets the cumulative total to 0. It then successively cumulatively adds the minimum SM values input between t and t+1. Further, when a pulse from the timer 71 is input again at the time t+1, the cumulative total is reset to 0.

The register 73 stores the value input from the minimum SM value accumulator 72 at the time when the pulse is input from the timer 71 and outputs the value to the table 62.

FIGS. 15A and 15B are views of an example of a table stored in the table 62. When the transmission system is QPSK and the coding rate R is 1/2, the magnitude of the transmission error rate (C/N) of data on the channel is judged in accordance with the table shown in FIG. 15A. When the transmission system is QPSK and the coding rate R is 3/4, the magnitude of the transmission error rate of the data on the channel is judged in accordance with the table shown in FIG. 15B.

Judging the error rate on the channel as described above required the minimum value processor 52 for calculating the value of the minimum state metric, the minimum SM value accumulator 72 provided at the monitoring circuit 11 and cumulatively adding the output from the minimum value processor 52, and the register 73 for storing the cumulative total. There was the problem that these circuits (apparatuses) 52, 72, and 73 became larger in circuit size along with an increase in the number of transmission signal points (number of states) transmitted from the transmitter 1 (four states in the above example).

Further, there was the problem that the calculation time also increased along with an increase in the number of states. Furthermore, in the BS transmission system, it is being proposed to transmit using different transmission systems for time division. When a plurality of transmission systems are used, there was the problem that, with the monitoring circuit 11 shown in FIG. 12, it became difficult to judge the transmission error rate.

DISCLOSURE OF THE INVENTION

An object of the present invention is to provide an error rate estimating device used for a receiver which enables a shortening of the calculation time and a reduction of the circuit scale by judging the error rate on a channel using the number of times of normalization performed in a circuit for finding a state metric.

Another object of the present invention is to provide a receiver using the above error rate estimating device.

Still another object of the present invention is to provide an error rate estimating method enabling a shortening of the calculation time when judging the error rate on the channel using the number of times of normalization performed in a circuit for finding a state metric.

Still another object of the present invention is to provide a decoding method using the above possible error rate estimating method.

Still another object of the present invention is to provide an information recording medium provided with software for executing a method for realizing the above error rate estimating method and decoding method.

According to a first aspect of the present invention, there is provided an error rate estimating device for estimating the error rate of an quadrature-modulated signal when decoding the signal, the error rate estimating device provided with a counting means for counting the number of times of normalization, performed when generating a state metric, within a predetermined time and an estimating means for estimating the error rate of the signal from the correspondence between the number of times of normalization and the error rate respectively determined for each different transmission system or each different coding rate based on the number of times of normalization counted by the counting means.

Preferably, the estimating means estimates the error rate based on a table establishing correspondence between the number of times of normalization and the error rate on a channel.

Alternatively, preferably the estimating means inserts the number of times of normalization counted by the counting means into a predetermined function.

Alternatively, the counting means counts only the number of times of normalization for a signal of a predetermined transmission system or a predetermined coding rate.

According to a second aspect of the present invention, there is provided an error rate estimating method for estimating an error rate of a signal when decoding an quadrature-modulated signal, the error rate estimating method comprising (1) a counting step of counting the number of times of normalization, performed when generating a state metric, within a predetermined time and (2) an estimating step (3) of estimating the error rate of the signal from the correspondence between the number of times of normalization and the error rate respectively determined for each different transmission system or each different coding rate based on the number of times of normalization counted in the counting step.

Preferably, in the estimating step, the error rate is estimated based on a table establishing correspondence between the number of times of normalization and the error rate on a channel.

Alternatively, preferably, in the estimating step, the number of times of normalization counted in the counting step is inserted into a predetermined function.

Alternatively, in the counting step, only the number of times of normalization for a signal of a predetermined transmission system or a predetermined coding rate is counted.

According to a third aspect of the present invention, there is provided an information recording medium for providing information for control executed by a receiver receiving and decoding an quadrature-modulated signal transmitted through a channel, wherein the control information includes a count instruction for counting the number of times of normalization, performed when generating a state metric, within a predetermined time and an estimation instruction for estimating the error rate of the signal from the correspondence between the number of times of normalization and the error rate respectively determined for each different transmisssion system or each different coding rate based on the number of times of normalization counted when the count instruction is executed.

According to a fourth aspect of the present invention, there is provided an error rate estimating device for estimating an error rate of a signal when decoding a signal modulated by a plurality of transmission systems or coding rates, the error rate estimating device provided with a judging means for judging a transmission system or coding rate of the signal; a counting means for counting the number of times of normalization, performed when generating a state metric, for each of the plurality of transmission systems or coding rates; an estimating means for estimating the error rate for each signal from the correspondence between the number of times of normalization and the error rate respectively determined for each different transmission system or each different coding rate based on the number of times of normalization counted by the counting means; and a selecting means for selecting one of a plurality of error rates for each signal estimated by the estimating means.

Preferably, the selecting means selects the error rate according to the transmission system or the coding rate judged by the judging means.

Alternatively, preferably the selecting means selects an error rate to be output by comparing a plurality of error rates input with a predetermined reference value.

According to a fifth aspect of the present invention, there is provided an error rate estimating method for estimating an error rate of a signal when decoding a signal modulated by a plurality of transmission systems or coding rates, the error rate estimating method comprising (1) a judging step of judging a transmission system or coding rate of the signal; (2) a counting step of counting the number of times of normalization, performed when a state metric is generated, for each of the plurality of transmission systems or coding rates; (3) an estimating step of estimating the error rate for each signal each signal from the correspondence between the number of times of normalization and the error rate respectively determined for each different transmission system or each different coding rate based on the number of times of normalization counted in the counting step; and (4) a selecting step of selecting one of a plurality of error rates for each signal estimated in the estimating step.

Preferably, in the selecting step, the error rate is selected according to the transmission system or the coding rate judged by the judging step.

Alternatively, preferably, in the selecting step, an error rate to be output is selected by comparing a plurality of error rates input with a predetermined reference value.

According to a sixth aspect of the present invention, there is provided an information recording medium for providing information for control executed by a receiver receiving a signal modulated by a plurality of transmission systems or coding rates sent through a channel, wherein the control information includes a judgement instruction for judging a transmission system or coding rate of the signal; a count instruction for counting the number of times of normalization, performed when generating a state metric, within a predetermined time; an estimation instruction for estimating the error rate of the signal from the correspondence between the number of times of normalization and the error rate respectively determined for each different transmission shystem or each different coding rate based on the number of times of normalization counted in the count step; and a selection instruction for selecting one of a plurality of error rates for each signal estimated in the estimating step.

According to a seventh aspect of the present invention, there is provided an error rate estimating device for estimating an error rate of a signal when decoding a signal modulated by a plurality of transmission systems or coding rates, the error rate estimating device comprising a counting means for counting the number of times of normalization, performed when generating a state metric, for each of the plurality of transmission systems or coding rates; an estimating means for estimating the error rate for each signal by the number of times of normalization counted by the counting means; a multiplying means for determining a value for multiplication with the error rate for each signal according to a value of the error rate estimated by the estimating means for a predetermined transmission system or coding rate among the transmission systems or coding rates and multiplying with that value; and an outputting means for adding and outputting the error rate for each signal output from the multiplying means.

According to an eighth aspect of the present invention, there is provided an error rate estimating method for estimating an error rate of a signal when decoding a signal modulated by a plurality of transmission systems or coding rates, the error rate estimating method comprising (1) a counting step of counting the number of times of normalization, performed when generating a state metric, for each of the plurality of transmission systems or coding rates; (2) an estimating step of estimating the error rate for each signal by the number of times of normalization counted in the counting step; (3) a multiplying step of determining a value for multiplication with the error rate for each signal according to a value of the error rate estimated by the estimating step for a predetermined transmission system or coding rate among the transmission systems or coding rates and multiplying with that value; and (4) an outputting step of adding and outputting the error rate for each signal output in the multiplying step.

According to a ninth aspect of the present invention, there is provided an information recording medium for providing information for control executed by a receiver receiving and decoding a signal modulated by a plurality of transmission systems or coding rates sent through a channel, the control information including a count instruction for counting the number of times of normalization, performed when generating a state metric, for each of the plurality of transmission systems or coding rates; an estimation instruction for estimating the error rate for each signal by the number of times of normalization counted in the counting step; a multiplication instruction for determining a value for multiplication with the error rate for each signal according to a value of the error rate estimated by the estimating step for a predetermined transmission system or coding rate among the transmission systems or coding rates and multiplying with that value; and an output instruction for adding and outputting the error rate for each signal output from the multiplying step.

BRIEF DESCRIPTION OF THE DRAWINGS

FIG. 2 is a block diagram of the configuration of the encoder of FIG. 1.

FIGS. 3A and 3B are views for explaining a puncturing unit of FIG. 1.

FIGS. 4A and 4B are views for explaining the input/output data of the puncturing unit.

Figures 6A, 6B, 7A, 7B:
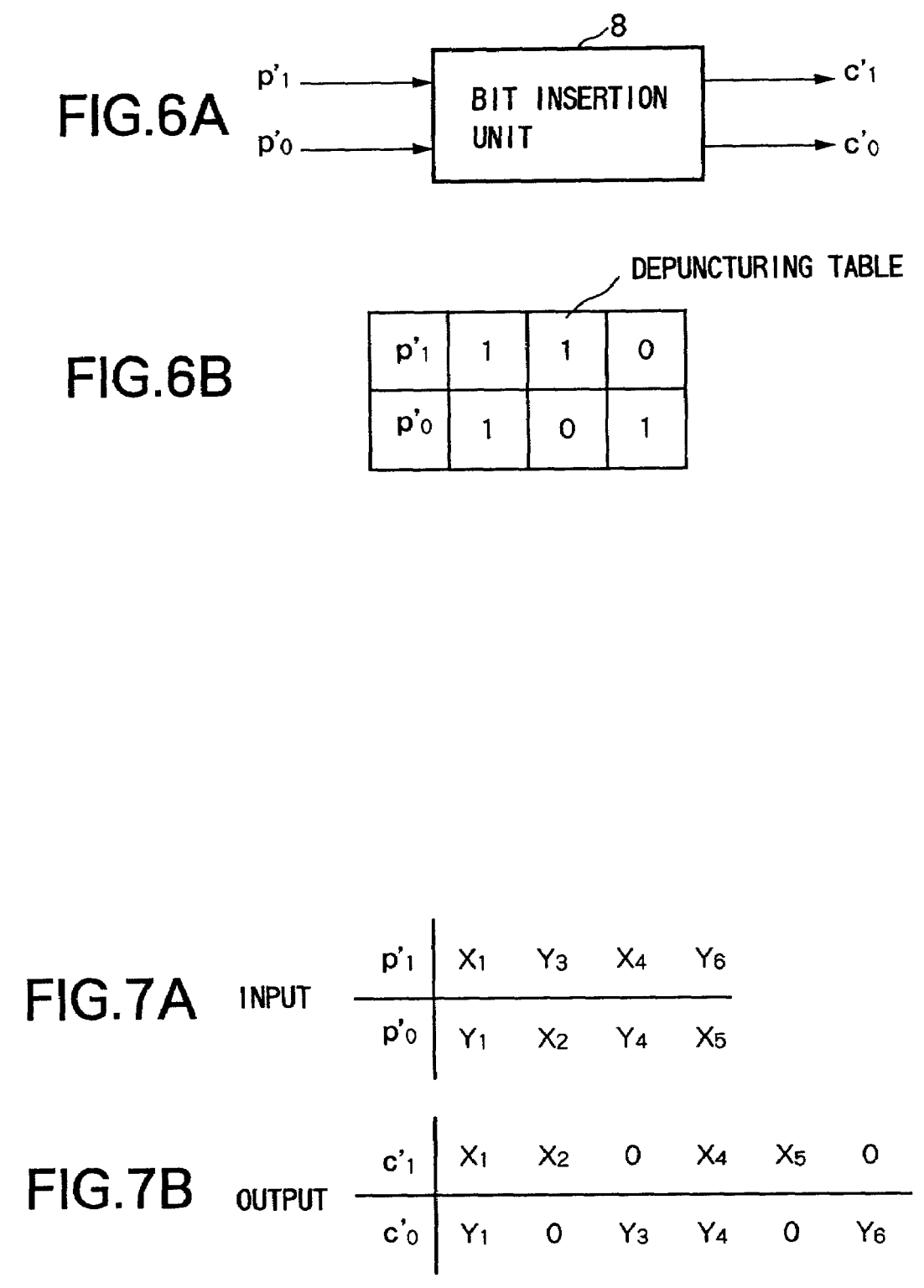

FIGS. 6A and 6B are views for explaining a bit insertion unit of FIG. 1.

FIGS. 7A and 7B are views for explaining the input/output data of the bit insertion unit.

FIGS. 14A to 14D are timing charts for explaining an operation of the accumulator of FIG. 13.

FIGS. 15A and 15B are views of a table stored in the table of FIG. 12.

FIG. 16 is a block diagram of the configuration of the ACS circuit of the present invention.

FIGS. 19A to 19D are timing charts for explaining the operation of the normalization accumulator in FIG. 18.

FIGS. 20A and 20B are views of a table stored in the table of FIG. 17.

FIGS. 21A and 21B are views of a table stored in the table of FIG. 17.

FIGS. 28A to 28F are timing charts for explaining an operation of the normalization accumulator of FIG. 27.

FIG. 33 is a view of a table stored in the selector of FIG. 30.

FIG. 34 is a view of a table stored in the selector of FIG. 30.

FIG. 37 is a view of a table stored in the selector of FIG. 36.

FIG. 39 is a view explaining the hardware configuration when realizing the decoding processing by software.

BEST MODE FOR CARRYING OUT THE INVENTION

Figure 1:
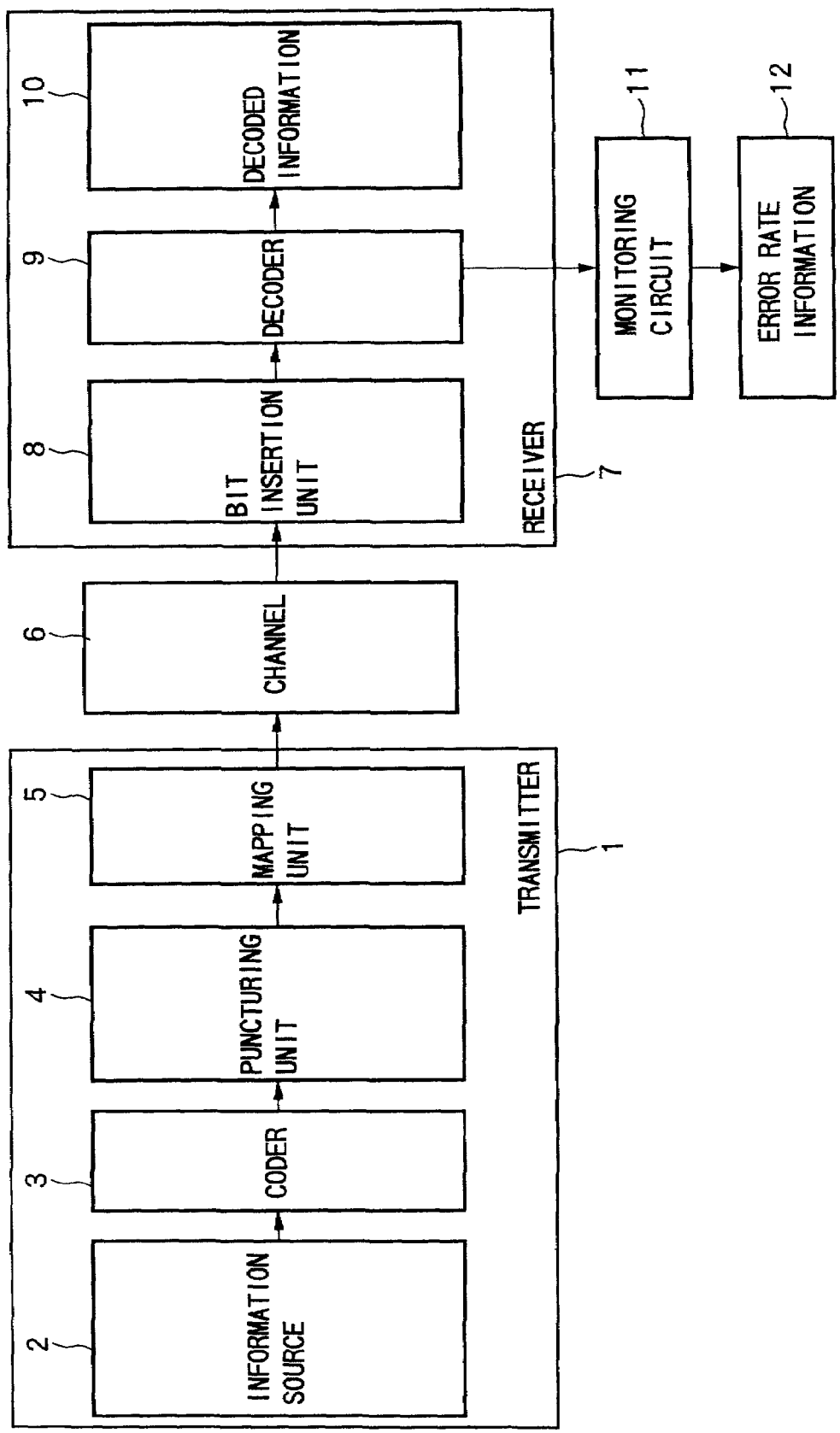
FIG. 1 is a block diagram of the configuration of a transmitter and a receiver.
Figure 5:
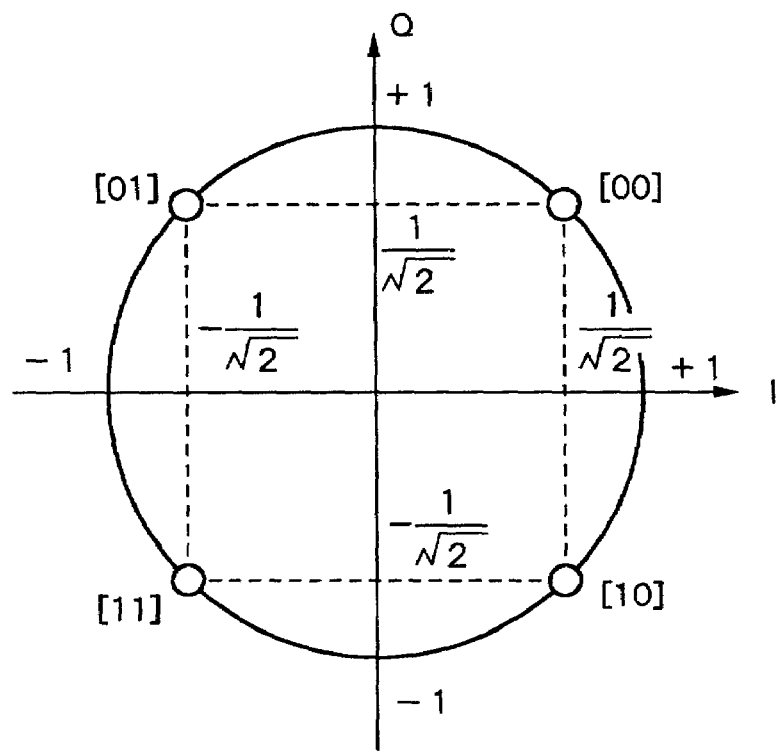
FIG. 5 is a view for explaining the arrangement of signal points by the mapping unit of FIG. 1.
Figure 8:
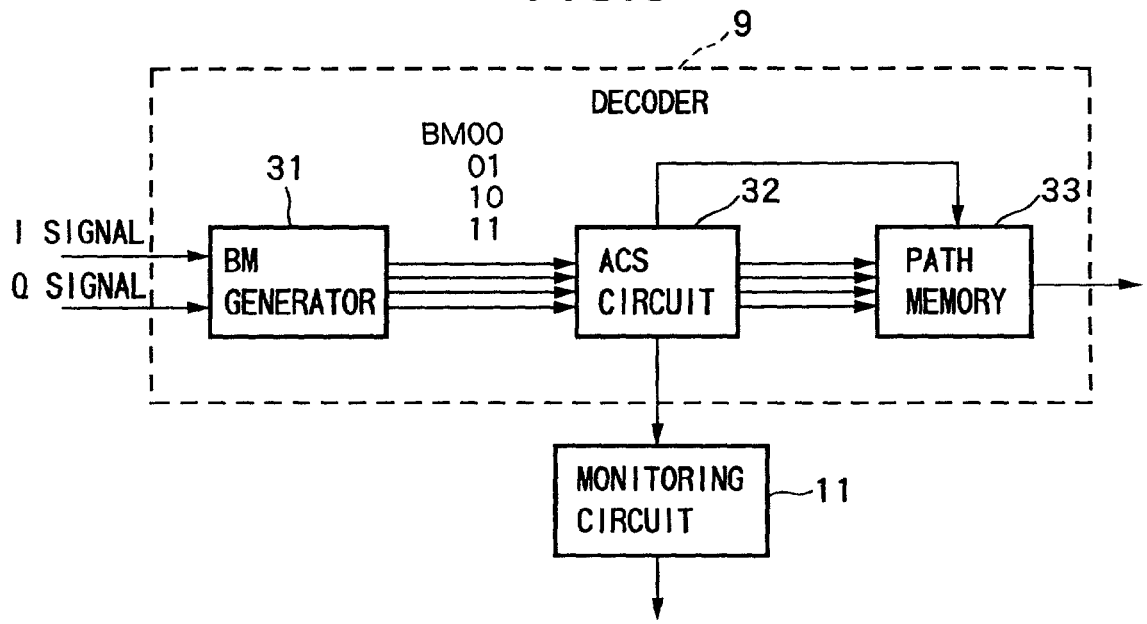
FIG. 8 is a block diagram of the configuration of the decoder of FIG. 1.
Figure 9:
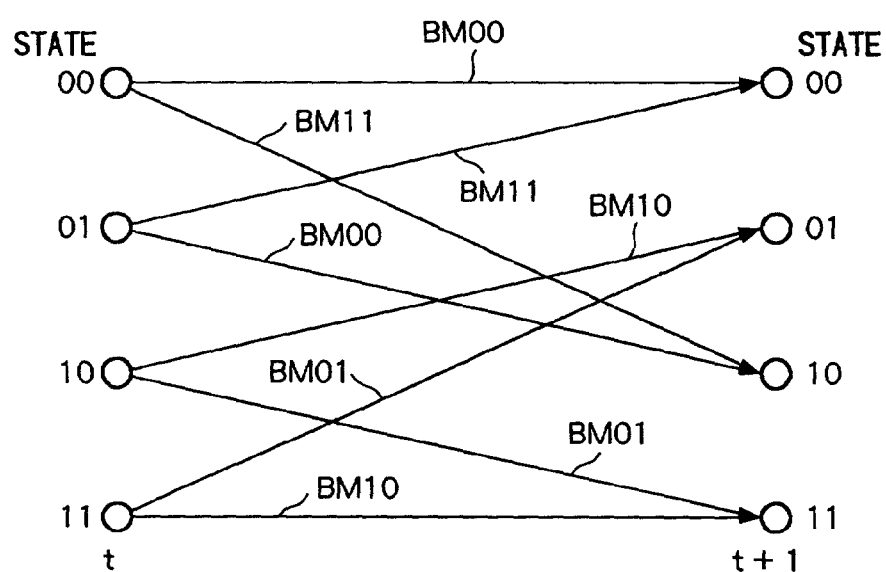
FIG. 9 is a trellis diagram.
Figure 10:
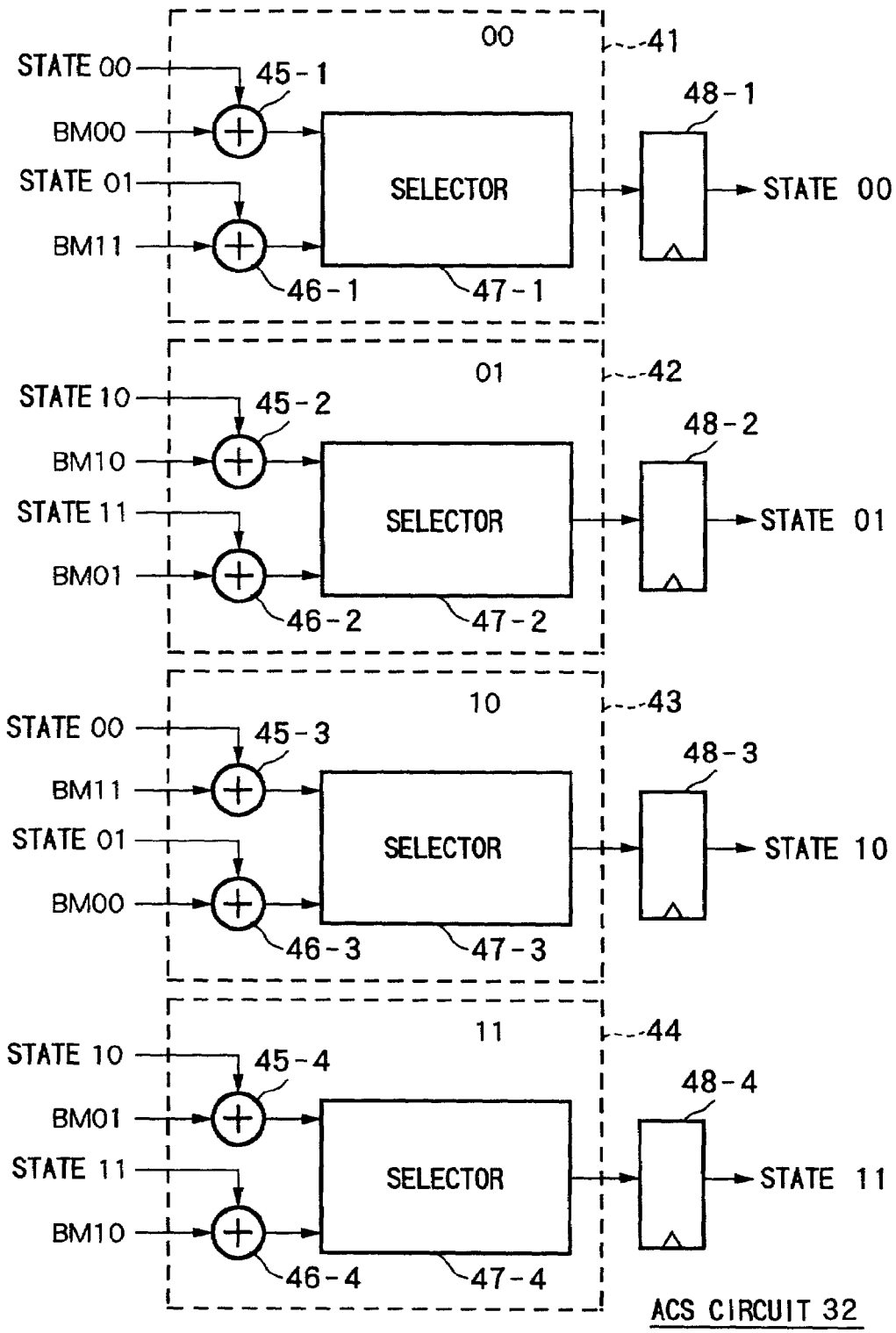
FIG. 10 is a block diagram of the configuration of the ACS circuit of FIG. 8.
Figure 11:
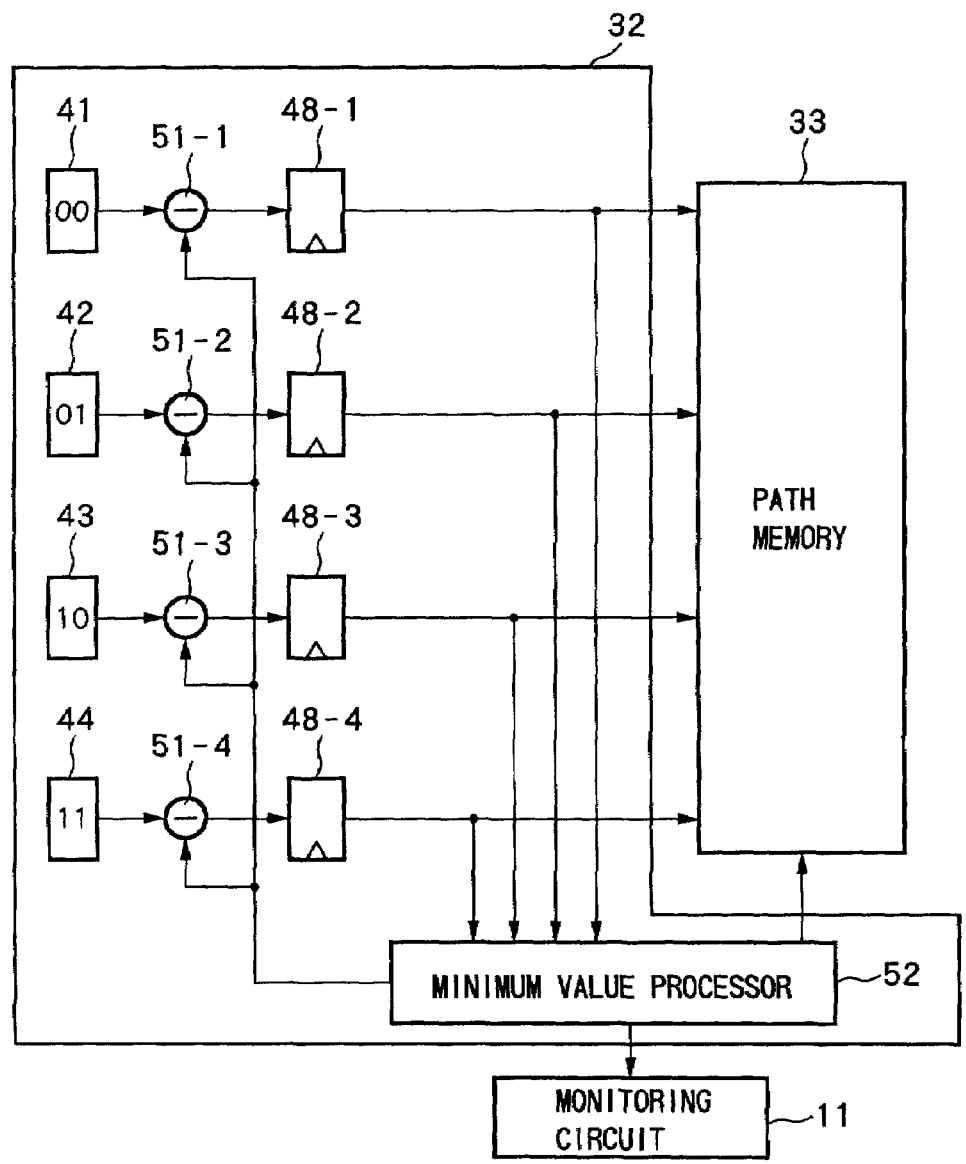
FIG. 11 is a block diagram of the configuration of an ACS circuit performing normalization.

A transmitter and receiver to which the present invention is applied are basically configured the same as in the configuration shown in FIG. 1, therefore explanations thereof are omitted. The method of judging the error rate on the channel performed at the receiver side in the present invention differs from that explained above. First, the configuration of the ACS circuit 32 of the decoder 9 will be explained with reference to FIG. 16.

FIG. 16 is a block diagram of the configuration of the ACS circuit 32 for performing normalization using the data of the upper bits of the state metrics of all states to find a state metric. The most significant bit of the N number of bits of data output from the state 00 generating unit 41 for generating the state metric of the state 00 is input to the register 48-1 through an EXOR (exclusive OR) circuit 81-1 for calculating the exclusive OR. The N−1 number of bits other than the most significant bit are input to the register 48-1 without going through the EXOR circuit 81-1. Data from the AND circuit 82 for calculating the AND is input to the EXOR circuit 81-1 as well. Data output from the register 48-1 is supplied to the path memory 33, while the most significant bit is supplied to the AND circuit 82.

In the same way, the most significant bit among the N number of bits of data output from the state 01 generating unit 42 is input to the register 48-2 through the EXOR circuit 81-2, while the N−1 number of bits other than the most significant bit are input to the register 48-2 without going through the EXOR circuit 81-2. Data from the AND circuit 82 is input to the EXOR circuit 81-2. Data output from the register 48-2 is supplied to the path memory 33, while the most significant bit is supplied to the AND circuit 82.

In addition, the most significant bit of the N number of bits of data output from the state 10 generating unit 43 is input to the register 48-3 through the EXOR circuit 81-3, while the N−1 number of bits other than the most significant bit are input to the register 48-3 without going through the EXOR circuit 81-3. Data from the AND circuit 82 is input to the EXOR circuit 81-3 as well. Data output from the register 48-3 is supplied to the path memory 33, while the most significant bit is supplied to the AND circuit 82.

Further, the most significant bit of the N number of bits of data output from the state 11 generating unit 44 is input to the register 48-4 through the EXOR circuit, while the N−1 number of bits other than the most significant bit is input to the register 48-4 without going through the EXOR circuit. Data output from the AND circuit 82 is input to the EXOR circuit 81-4 as well. Data output from the register 48-4 is supplied to the path memory 33, and the most significant bit is supplied to the AND circuit 82.

The AND circuit 82 outputs 1 when all of the most significant bits of data output from the registers 48-1 to 48-4 are 1 and outputs 0 at other times. When the values of the state metrics of the states gradually increase and the most significant bit of the minimum state metric becomes 1, it uses an exclusive OR operation (EXOR circuits 81-1 to 81-4) to make the most significant bits of the state metrics of all states 0 for normalization.

Figure 17:
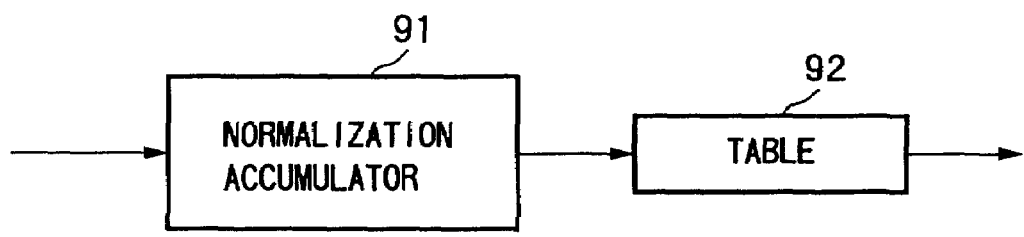
FIG. 17 is a block diagram of the configuration of the monitoring circuit to which the present invention is applied.

FIG. 17 is a block diagram of the configuration of the monitoring circuit 11. The monitoring circuit 11 is comprised of a normalization accumulator 91 and a table 92. The normalization information is input from the ACS circuit 32 to the normalization accumulator 91. The normalization information is information output to the monitoring circuit 11 each time the normalization is performed by the ACS circuit 32.

Figure 18:
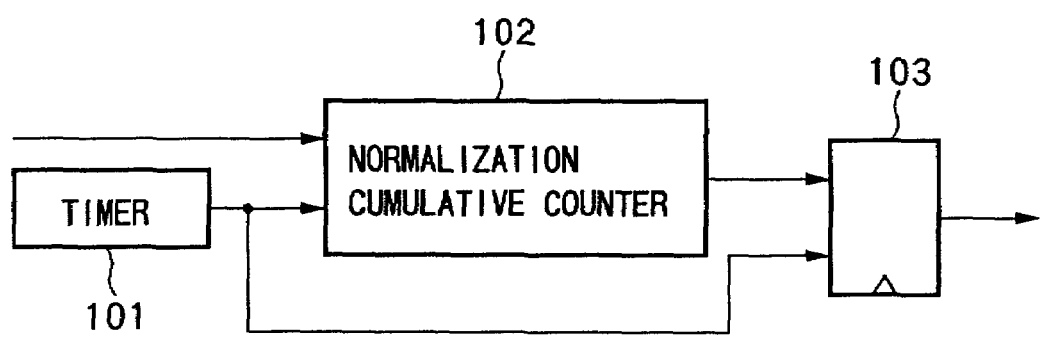
FIG. 18 is a block diagram of the configuration of a normalization accumulator in FIG. 17.

FIG. 18 is a block diagram of the configuration of the normalization accumulator 91. The normalization accumulator 91 is comprised of a timer 101, a normalization cumulative counter 102, and a register 103. Normalization information output from the ACS circuit 32 is input to the normalization cumulative counter 102. A pulse generated by the timer 101 every predetermined time is input to the normalization cumulative counter 102 as well. The pulse generated by the timer 101 is output to the register 103 as well. The output from the normalization cumulative counter 102 is input to the register 103 as well.

The operation of the normalization accumulator 91 shown in FIG. 18 will be explained referring to the timing chart in FIGS. 19A to 19D. As shown in FIG. 19A, a pulse is generated for every time unit by the timer 101, and the generated pulse is supplied to the normalization cumulative counter 102 and the register 103. As shown in FIG. 19B, the normalization cumulative counter 102 counts the number of times of input when the normalization information is output from the ACS circuit 32. In the example shown in FIGS. 19A to 19D, eight times of normalization information are input during one time unit.

The normalization cumulative counter 102 outputs the counter value to the register 103 and resets its value to 0 (FIG. 19D) for every pulse supplied from the timer 101. In this way, the counter value output to and stored in the register 103 is output to the table 92 when the pulse from the timer 101 is input.

FIGS. 20A and 20B are views of examples of tables stored by the table 92. The table shown in FIGS. 20A and 20B shows the correspondence between the counter value (count) output from the register 103 of the normalization accumulator 91 and the value of the transmission error rate (BER: bit error rate) of the channel 6 estimated from the count. FIG. 20A is a table in the case where the transmission system is the QPSK system and the coding rate R is 1/2, while FIG. 20B is a table in the case where the transmission system is the QPSK system and the coding rate R is 3/4.

For instance, in the case where the transmission system is the QPSK system and the coding rate R is 1/2, when the count supplied from the register 103 is 355 or more, the value output as the error rate information 12 of the channel 6 (FIG. 1) is $0.50 \times 10^{-3}$. In the same way, a value calculated based on the table from the transmission system, coding rate, and a value corresponding to the count is output as the error rate information 12.

FIGS. 21A and 21B show tables in the case where the CN ratio (carrier to noise ratio) is output as the error rate information 12. FIG. 21A is a table when the transmission system is the QPSK system and the coding rate R is 1/2, while FIG. 21B is a table when the transmission system is the QPSK system and the coding rate R is 3/4. For instance, in the case where the transmission system is the QPSK system and the coding rate R is 1/2, when the count supplied from the register 103 is 355 or more, the value output as the error rate information 12 of the channel 6 is 3.00 (dB).

Figure 22:
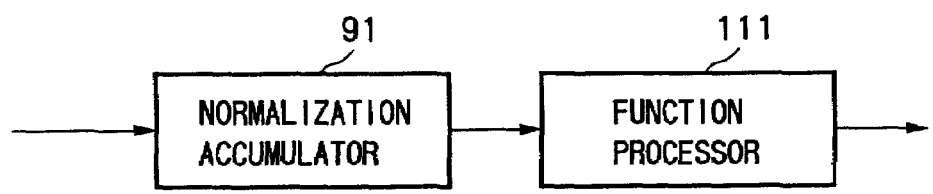
FIG. 22 is a block diagram of another configuration of the monitoring circuit.

FIG. 22 is a block diagram of another configuration of the monitoring circuit 11. The monitoring circuit 11 shown in FIG. 22 is comprised of, the normalization accumulator 91 and a function processor 111. The function processor 111 estimates the error rate information 12 without using the tables shown in FIGS. 20A and 20B and FIGS. 21A and 21B, but by using the function f calculated from these tables.

In the table shown in FIG. 20A in the case where the transmission system is the QPSK system and the coding rate R is 1/2, BER is $1.09 \times 10^{-3}$ when the count is from 345 to 354 (representative value of 350) and BER is $0.80 \times 10^{-2}$ when the count is from 335 to 344 (representative value of 340). In the other words, it is learned that if the count is reduced by 10 from 350 to 340, the value of BER increases by about four times. Calculating the equation used in the function processor 111 considering this fact gives the following equation (1):

$$f(\text{input}) = 0.0005 \times 4^{((360-\text{input})/10)} \tag{1}$$

In equation (1), the above "input" shows the count input from the normalization accumulator 91.

Note that in equation (1), the range of the count able to be used as input is from 335 to 354. When the count is 334 or less, $0.2 \times 10^{-1}$ is output as the error rate information 12, while when the count is 355 or more, $0.5 \times 10^{-3}$ is output as the error rate information 12.

This is because a difference arises between the value obtained from the function f and the value used when preparing a table (function f no longer followed). In this way, in the practical range, the function f is used in the range where there is no problem, while a value based on the count is output in other ranges.

In the same way, the following equation (2) is derived as a function f corresponding to the table of FIG. 20B in the case where the transmission system is the QPSK system and the coding rate is 3/4:

$$f(\text{input})=0.0033\times3^{((580-input)/10)} \quad (2)$$

In equation (2), the range of the count able to be used as the input is 545 to 565. When the count is 544 or less, $1.90\times10^{-1}$ is output as the error rate information 12, while when the count 565 or more, $4.80\times10^{-3}$ is output as the error rate information 12.

The following equation (3) is derived as a function f corresponding to the table shown in FIG. 21A in the case where the transmission system is the QPSK system and the coding rate is 1/2.

$$f(\text{input})=0.05^{(input-300)} \quad (3)$$

In equation (3), the range of the count able to be used as the input is 335 to 355. When the count is 334 or less, 1.50 is output as the error rate information 12, while when the count is 355 or more, 3.00 is output as the error rate information 12.

The following equation (4) is derived as a function f corresponding to the table shown in FIG. 21B in the case where the transmission system is the QPSK system and the coding rate is 3/4.

$$f(\text{input})=0.025^{(input-500)} \quad (4)$$

In equation (4), the range of the count able to be used as the input is 544 to 565. When the count is 544 or less, 0.85 is output as the error rate information 12, while when the count is 565 or more, 2.20 is output as the error rate information 12.

Figure 23:
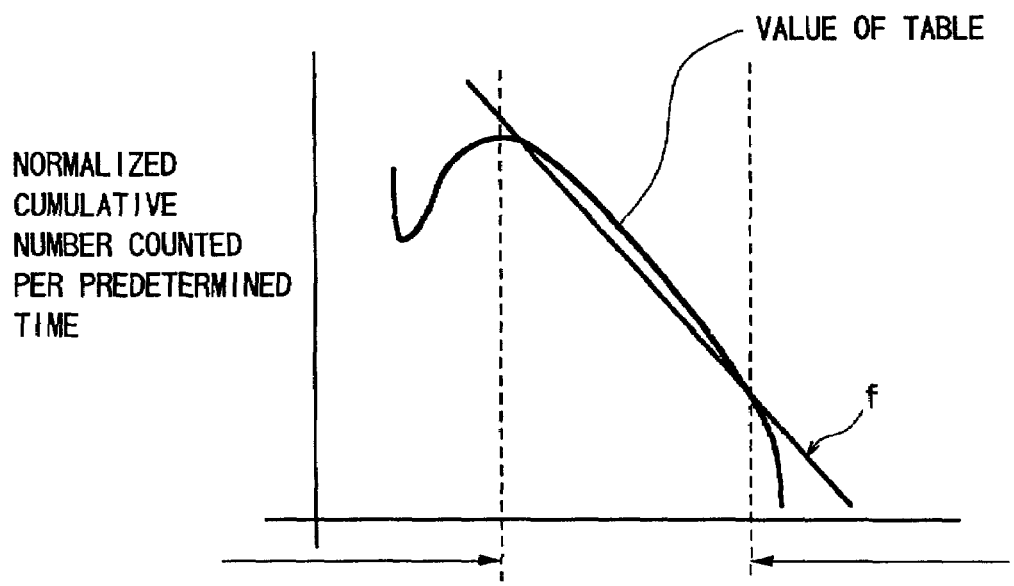
FIG. 23 is a graph illustrating the function of the function processor of FIG. 22.

FIG. 23 shows the relation between data serving as the basis when preparing a table and a graph obtained by any one equation among equations (1) to (4). As will be understood from FIG. 23, equations (1) to (4) approximate the values of the table within the dotted lines. Outside of the dotted lines, since the equations do not approximate to the values of the table, as described above, the error rate information 12 is not obtained using equations (1) to (4), but a predetermined value is output. Note that in practice, if the BER or C/N value obtained by equations (1) to (4) is sufficient, it is possible not to output the error rate information 12 outside the range obtained by equations (1) to (4).

Figure 24:
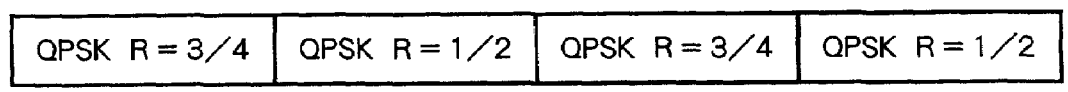
FIG. 24 is a view for explaining a frame structure of a different coding rate.

In the above explanation, the case where the transmission system was the QPSK system and the coding rate R was either of 1/2 or 3/4 was explained, but different transmission systems or coding rates R are mixed in some cases. For example, as shown in FIG. 24, the following explanation will be given taking as an example the case where the transmission system is the QPSK system, but the coding rate R is a mixture of 1/2 and 3/4.

Figure 25:
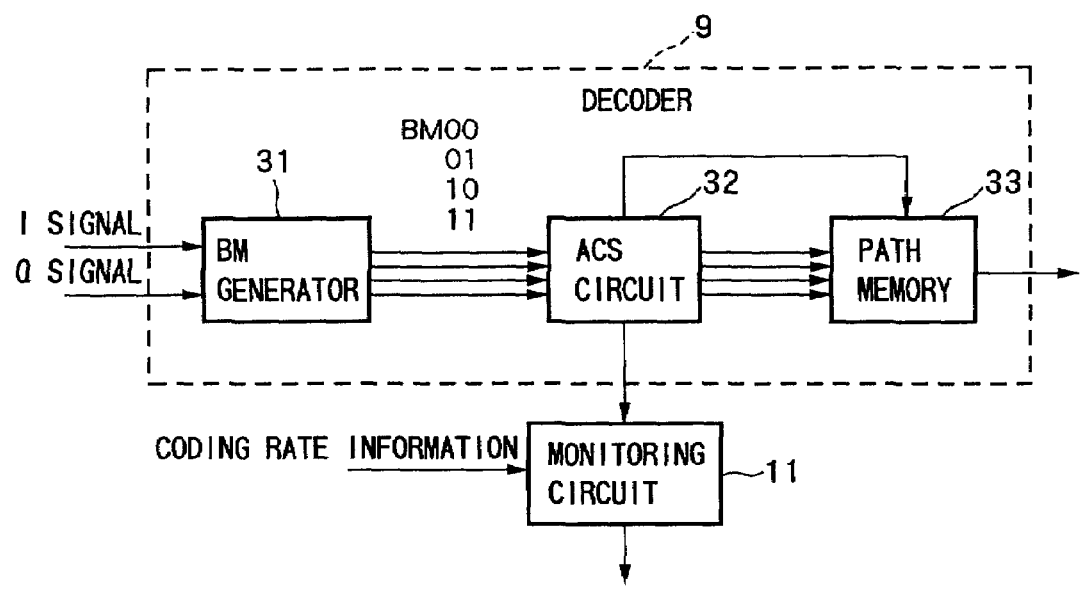
FIG. 25 is a view for explaining another configuration of the decoder.

FIG. 25 is a block diagram of the configuration of the decoder 9 and the monitoring circuit 11 in the case where different coding rates R are mixed together. In this configuration, the monitoring circuit 11 receives as input information relating to the coding rate R from the bit insertion unit 8 (FIG. 1). The bit insertion unit 8 judges the coding rate R, outputs a signal as is to the decoder 9 when a signal of a coding rate R of 1/2 is input, and inserts bits by depuncturing and then outputs the signal to the decoder 9 when a signal of a coding rate R of 3/4 is input. The monitoring circuit 11 receives as input information of the judged coding rate R.

Figure 26:
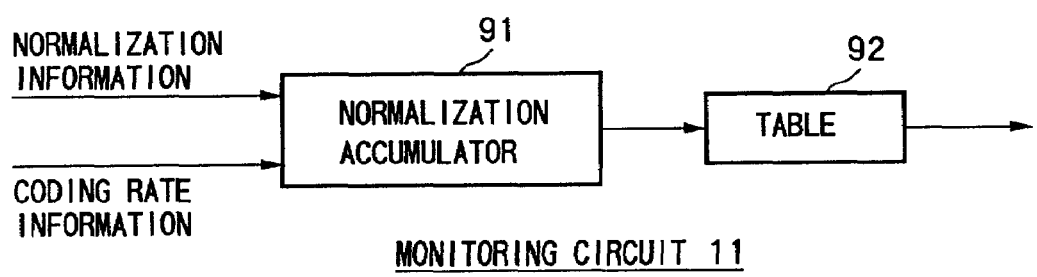
FIG. 26 is a block diagram of the configuration of the monitoring circuit of FIG. 25.

FIG. 26 is a block diagram of the configuration of the monitoring circuit 11 shown in FIG. 25. The normalization accumulator 91 in this configuration receives as input the normalization information from the ACS circuit 32 and the coding rate information from the bit insertion unit 8.

Figure 27:
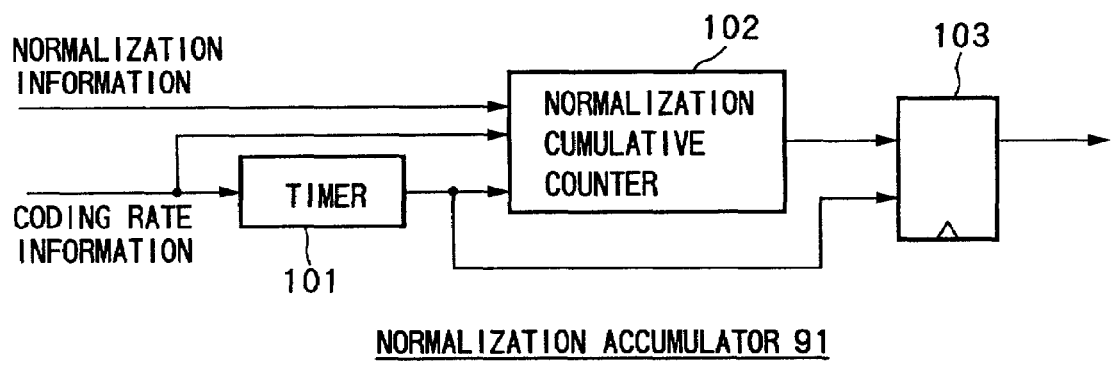
FIG. 27 is a block diagram of the configuration of the normalization accumulator of FIG. 26.

FIG. 27 is a block diagram of the configuration of the normalization accumulator 91 shown in FIG. 26. In this configuration, the timer 101 and the normalization cumulative counter 102 receive as input the coding rate information. The normalization cumulative counter 102 also receives as input the normalization information and the pulses output from the timer 101. The register 103 receives as input the output from the normalization cumulative counter 102 and the pulses from the timer 101.

The operation of the normalization accumulator 91 shown in FIGS. 28A to 28F will be explained next referring to the timing chart of FIG. 27. The explanation will be made of the case where the transmission system is the QPSK system, but the coding rate R is changed in the order of 1/2, 3/4, and 1/2 as shown FIG. 28A and the case where a pulse is generated at the timer 101 as shown in FIG. 28B. The interval between the pulse generated at the timer 101 at a predetermined time and the pulse the next time is defined as one time unit.

Here, for instance, if the coding rate information is made 1 when the coding rate R is 1/2 and is made 0 when the coding rate R is 3/4, when the coding rate R changes as shown in FIG. 28A, the coding rate information becomes as shown in FIG. 28C. Further, as shown in FIG. 28D, when the normalization information is input a total of eight times in a time unit, that is, six times when the coding rate R is 1/2 and two times when the coding rate R is 3/4, in the normalization cumulative counter 102, the normalization cumulative counter 102 counts only the number of times of normalization at the same coding rate R, in the other words, only the number of times of normalization when the coding rate information is 1.

That is, in the example shown in FIG. 28E, only the number of times of normalization when the coding rate R is 1/2 is counted, so the value output to the table 92 from the register 103 as the number of times of normalization number for one time unit becomes six.

The table 92 uses the value input in this way and the stored table to calculate and output the error rate information 12. As the tables which the table 92 stores, the table shown in FIGS. 20A and 20B or the table shown in FIGS. 21A and 21B may be used. Further, it is possible to find the error rate information 12 from the function f.

Figure 29:
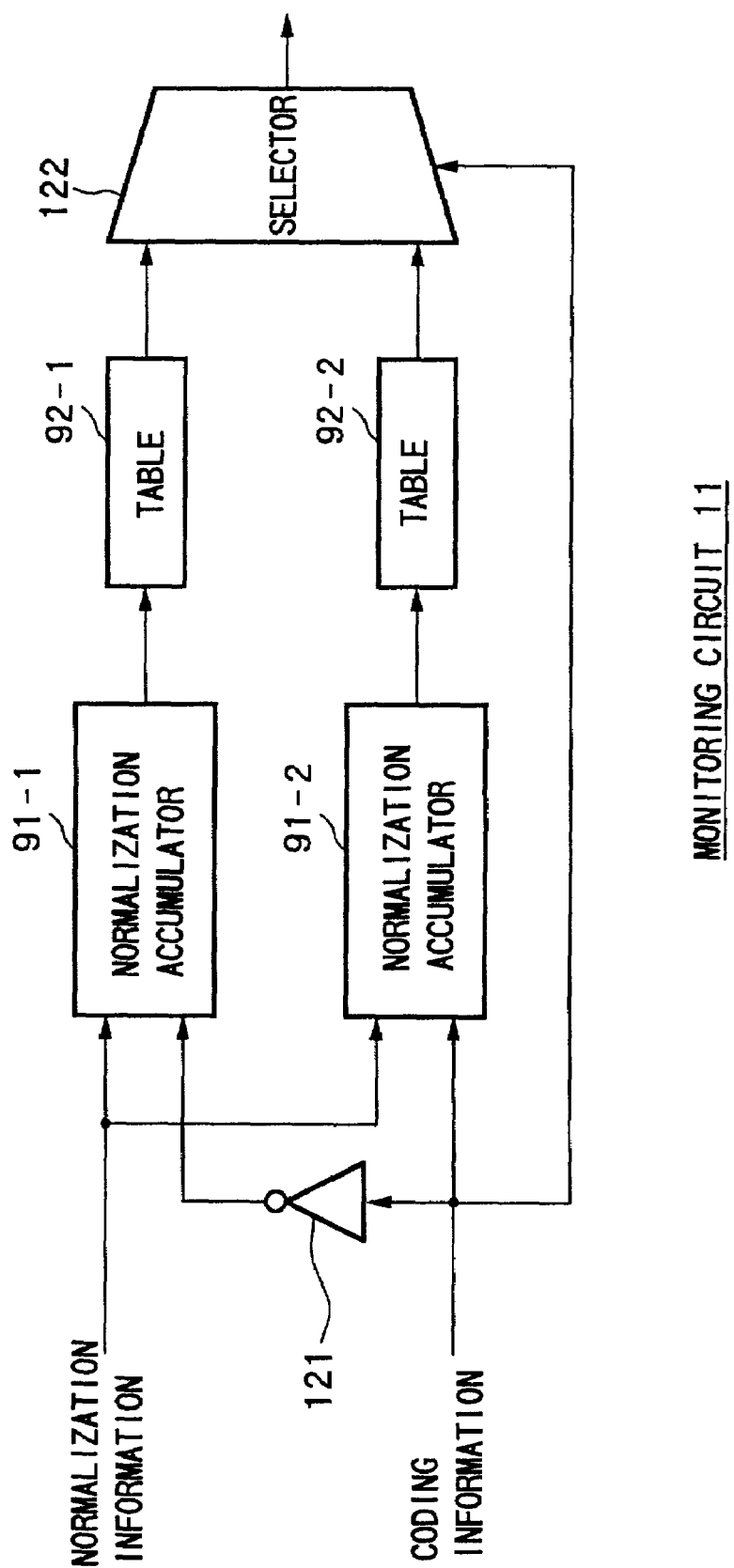
FIG. 29 is a block diagram of another example of the configuration of the monitoring circuit.

FIG. 29 is a block diagram of another configuration of the monitoring circuit 11 for estimating the error rate information 12 when different transmission systems or coding rates R are mixed together. In this configuration, the error rate information 12 is estimated separately for the signals with the coding rate R of 1/2 and the signals with the coding rate R of 3/4. A normalization accumulator 91-1 and a normalization accumulator 91-2 receive as input normalization information from the ACS circuit 32. The coding rate information from the bit insertion unit 8 is supplied to the normalization accumulator 91-2 and the selector 122 and is also supplied to the normalization accumulator 91-1 through a NOT circuit 121. The coding rate information input to the normalization accumulator 91-1 is input through the NOT circuit 121, so information opposite to that of the normalization accumulator 91-2 is input.

The information output from the normalization accumulator 91-1 is input to the table 92-1, while the information output from the normalization accumulator 91-2 is input to the table 92-2. The information output from the table 92-1 and table 92-2 is input to the selector 122. The selector 122 selects and outputs one of the information input from the tables 92-1 and 92-2 based on the input coding information.

Figure 12:
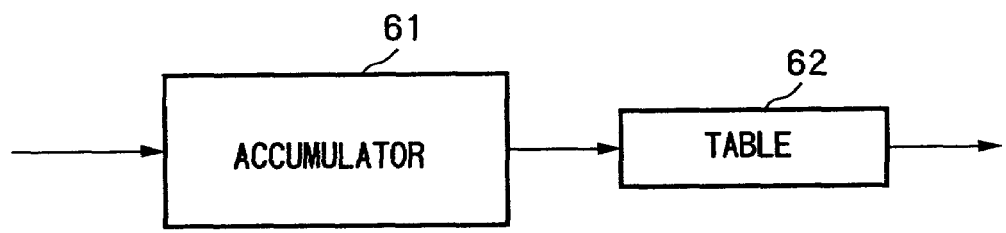
FIG. 12 is a block diagram of the configuration of the monitoring circuit of FIG. 8.
Figure 13:
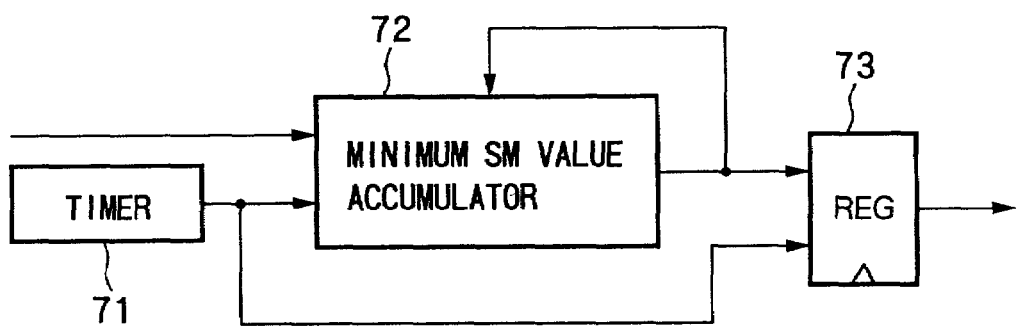
FIG. 13 is a block diagram of the configuration of the accumulator of FIG. 12.

The normalization accumulator 91-1 and the normalization accumulator 91-2 are configured as shown in FIG. 12. The normalization accumulator 91-1 counts the number of times of normalization input when the coding rate information is of the coding rate R of 1/2, while the normalization accumulator 91-2 counts the number of times of normalization input when the coding rate information is of the coding rate R of 3/4. As explained above, since the mutually opposite coding rate information input to the normalization accumulator 91-1 and the normalization accumulator 91-2 are input, when one of the number of times of normalization is being counted, the other is not counted.

The numbers of times of normalization counted by the normalization accumulators 91-1 and 91-2 in this way are output to the corresponding tables 92-1 and 92-2. The table 92-1 stores the tables shown in FIG. 20A and FIG. 21A, while the table 92-2 stores the tables shown in FIG. 20B and FIG. 21B. The tables 92-1 and 92-2 estimate the error rate information 12 according to the tables they store and output the results to the selector 122. The selector 122 selects the input from the tables 92-1 and 92-2 corresponding to the coding rate which the input coding rate information indicates and outputs the same as the error rate information 12.

Figure 30:
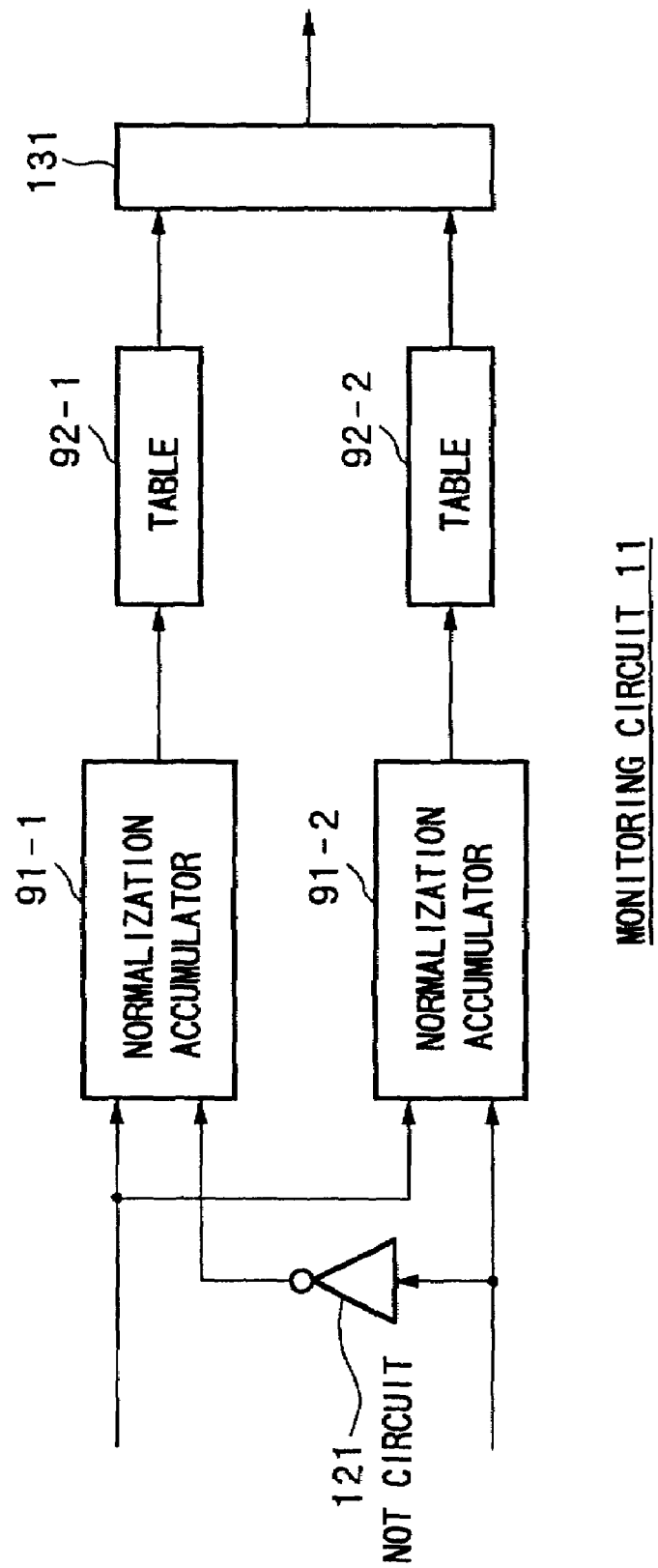
FIG. 30 is a block diagram of still another example of the configuration of the monitoring circuit.
Figure 31:
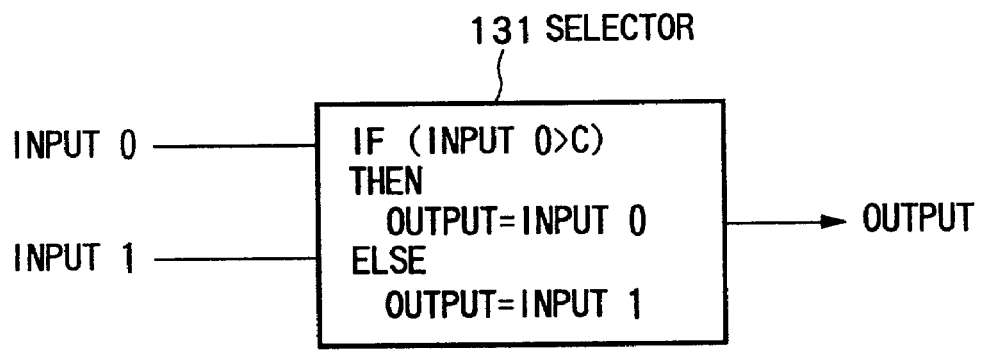
FIG. 31 is a view of the configuration of the selector of FIG. 30.

FIG. 30 is a block diagram of another configuration of the monitoring circuit 11. The selector 131 of this configuration selects and outputs an input from the tables 92-1 and 92-2 without using the coding information. The configuration of the selector 131 is shown in FIG. 31. The selector 131 stores the constant C. This constant C and the input value are compared to determine the output information. That is, when the input 0 is made the input from the table 92-1 and the input 1 is made the input from the table 92-2, the input O is output as the error rate information 12 if input O is larger than the constant C, while the input 1 is output as the error rate information 12 if the input O is equal to or less than the constant C.

Figure 32:
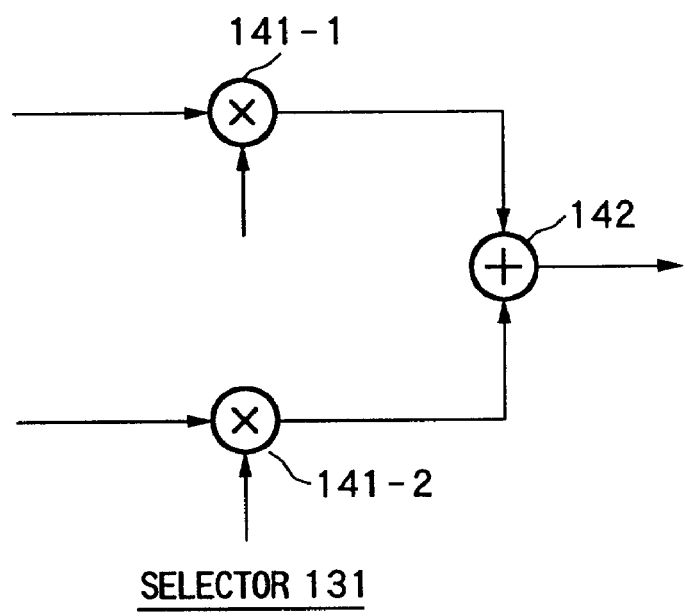
FIG. 32 is a view of the configuration of the selector of FIG. 30.

FIG. 32 is a block diagram of another configuration of the selector 131. The selector 131 outputs a value giving a predetermined weight to the input value. the multiplier 141-1 receives as input information from the table 92-1, while the multiplier 141-2 receives as input the information from the table 92-2. The multipliers 141-1 and 141-2 multiply the values input to them with a predetermined value and output the results to an adder 142. The adder 142 adds and outputs the sum of the input values.

FIG. 33 is a table showing weighting values to be multiplied by the multipliers 141-1 and 141-2. The table is stored in a not shown storage unit and is supplied to the multipliers 141-1 and 141-2 of the selector 131 in accordance with need. The table is a table corresponding to the table shown in FIGS. 21A and 21B. The value for the weighting is determined based on the error rate information 12 of the coding rate R=1/2 (information output from the table 91-1). For instance, when information from the table 92-1 input to the multiplier 141-1 is 2.5, 1.0 is supplied as the weighting value to the multiplier 141-1 and 0.0 is supplied as the weighting value to the multiplier 141-2.

FIG. 34 is another table of the weighting values. The table is a table for the case of weighting based on the information of the cumulative number of times of normalization when the coding rate R=3/4. When weighting in accordance with the table, the multipliers 141-1 and 141-2 (FIG. 32) are supplied with output from the normalization accumulator 91-2. The multipliers 141-1 and 141-2 weight the values input from the tables 92-1 and 92-2 based on the input normalization information and output the results. For example, when the information of the cumulative number of times of normalization output from the normalization accumulator 91-2 is 570, the multiplier 141-1 multiplies 0.0 with the value input from the table 92-1 by 0.0, the multiplier 141-2 multiplies 1.0 with the value input from the table 92-2, and these output the results to the adder 142.

In the above explanation, the tables 92-1 and 92-2 estimated the error rate information 12 from the stored tables, but it is also possible to estimate this using the above functions. Namely, it is also possible to use a function processor using the function of equation (3) instead of the table 92-1 and use a function processor using a function of equation (2) instead of the table 92-2.

Figure 35:
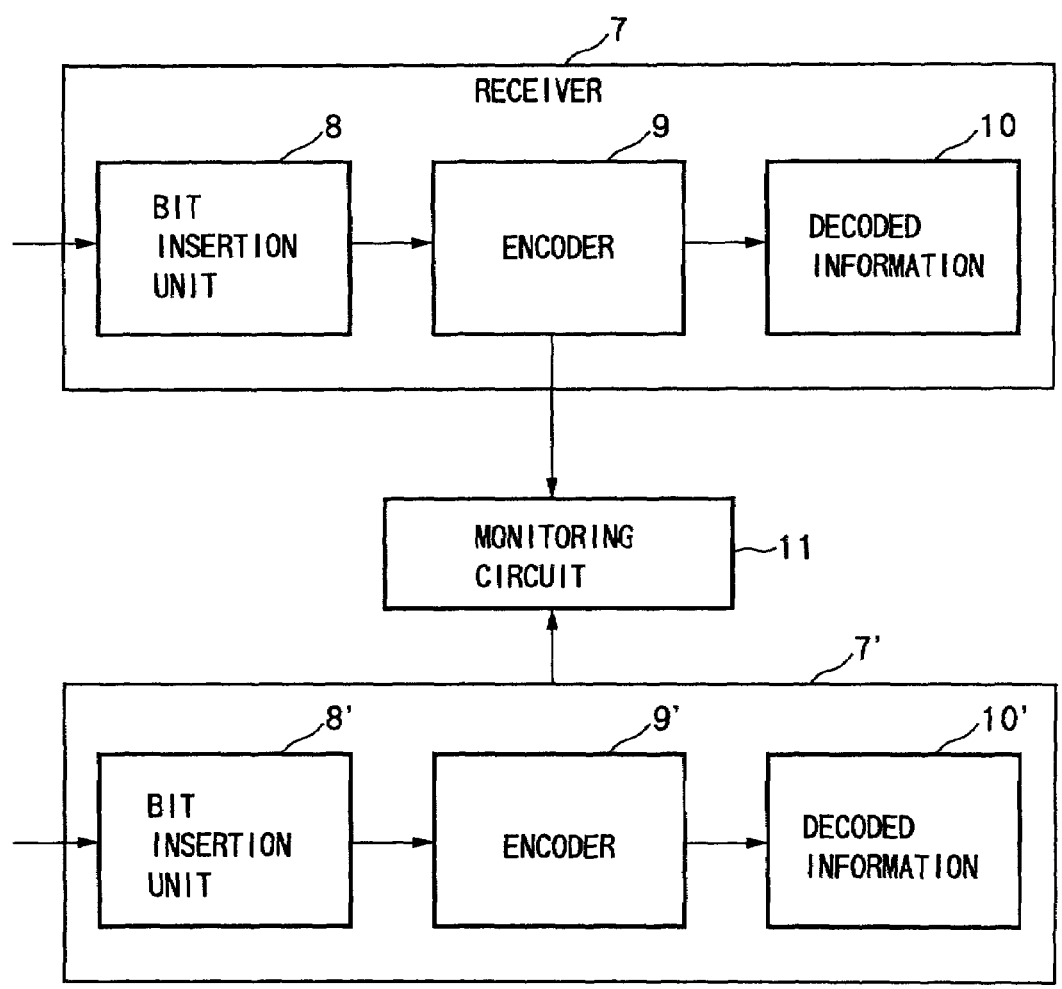
FIG. 35 is a block diagram of the configuration of the monitoring circuit and the receiver when simultaneously receiving signals of different coding rates.

Next, a monitoring circuit 11 in the case of simultaneously receiving and processing two or more signals transmitted by different transmission systems (coding rates) will be explained. FIG. 35 is a block diagram of the configuration of a receiver including a monitoring circuit 11 which simultaneously receives and processes two or more signals transmitted by different transmission systems. The monitoring circuit 11 receives as input normalization information from the decoders 9 and 9'.

Figure 36:
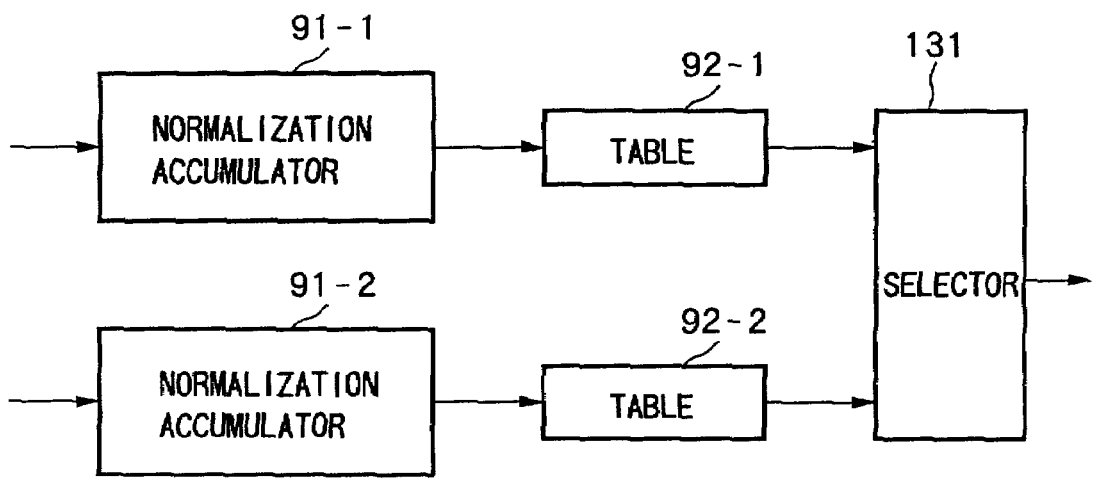
FIG. 36 is a block diagram of the configuration of the monitoring circuit of FIG. 35.

FIG. 36 is a block diagram of the configuration of the monitoring circuit 11 of FIG. 35. The normalization accumulator 91-1 receives as input the normalization information of the encoder 9, while the normalization accumulator 91-2 receives as input the normalization information of the coder 9'. The information output from the normalization accumulator 91-1 is input to the table 92-1, while the information output from the normalization accumulator 91-2 is input to the table 92-2. The information output from the tables 92-1 and 92-2 are input to the selector 131.

The normalization accumulators 91-1 and 91-2 are configured is shown in FIG. 3. The normalization accumulator 91-1 cumulatively adds the number of times of normalization for a signal of a coding rate R of 1/2, while the normalization accumulator 91-2 cumulatively adds the number of times of normalization of a signal of a coding rate R of 3/4. The table 92-1 stores the table of FIG. 21A, while the table 92-2 stores the table of FIG. 21B. The selector 131 is configured as shown in FIG. 32, stores the table shown in FIG. 37, weights the input value based on the stored table, and outputs the result.

The table shown in FIG. 37 shows a table in the case of weighting based on an estimated value of the error rate information 12 for a coding rate R=3/4 (information output from the table 92-2). For instance, when the estimated value output from the table 92-2 is 2.5, the selector 131 multiplies 1.0 with the estimated value input from the table 92-1 based on the table shown in FIG. 37, multiplies 0.0 with the estimated value input from the table 92-2, adds the values, and outputs the result.

As described above, since the error rate on the channel is calculated based on the number of times of normalization performed in the ACS circuit 32 for finding the state metric, the circuit can be made smaller and simpler. It is also possible to properly estimate the error rate information for a signal transmitted by different transmission systems or coding rates.

Next, an explanation will be given, using FIG. 38, of the hardware configuration of the transmitter 1 in the case of coding processing explained using FIG. 1 to FIG. 37 by software.

Figure 38:
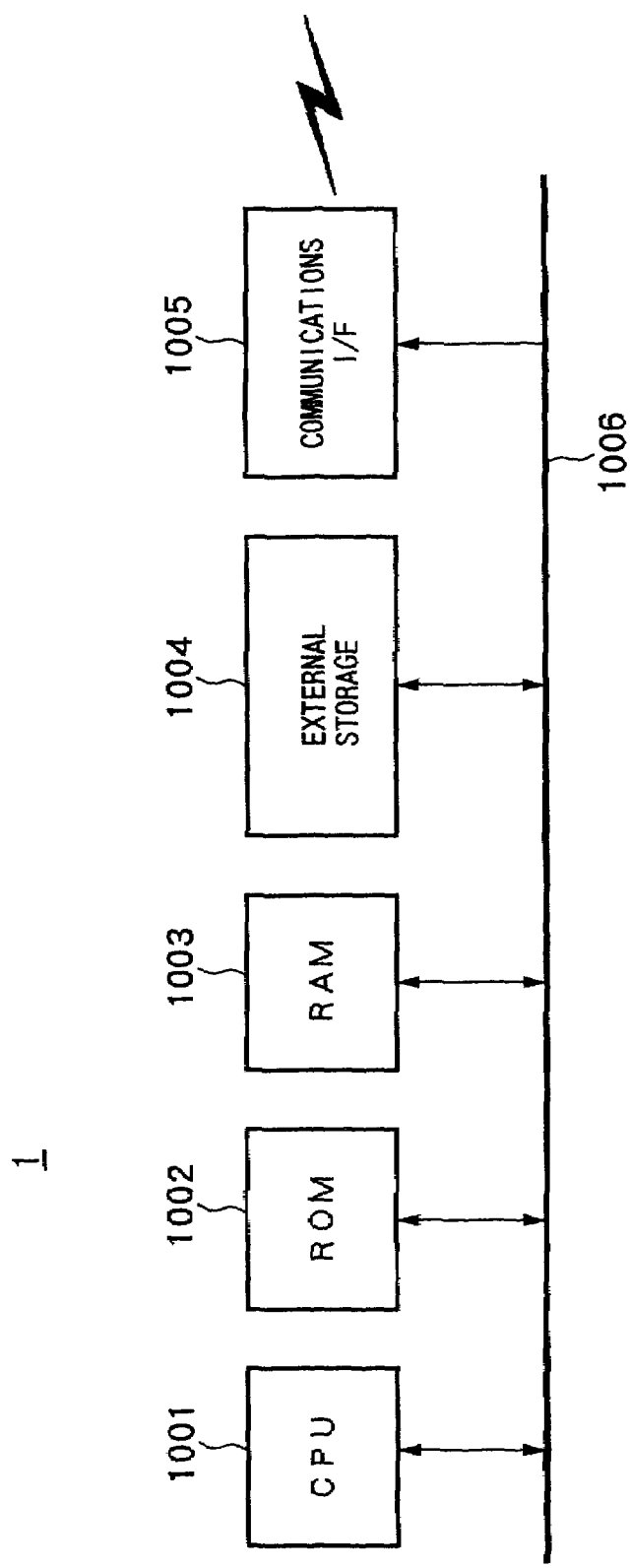
FIG. 38 is a view explaining the hardware configuration when realizing the coding processing by software.

In FIG. 38, the transmitter 1 is provided with a CPU (central processing unit) 1001 for executing a processing program, a ROM (read only memory) 1002 storing a processing program for processing in accordance with a coding routine explained using FIG. 1 to FIG. 37, a RAM (random access memory) 1003 temporarily storing processing data, an external storage 1004 storing data to be coded and transmitted, and a communications I/F (interface) 1005 for transmitting an I-signal and Q-signal of a signal point through the channel 6 to the receiver 7. Further, it is provided with a path 1006 connected to the circuits for transmission of the program or data.

The external storage 1004 is a randomly accessible information storage medium such as a magnetic disk or optical disk.

Note that the processing program of the present embodiment is stored in the ROM 1002 in this configuration, but it is also possible to have it stored in an external storage 1004 and to transfer it through the bus 1006 to the RAM 1003 at the time of execution and execute it by the CPU 1001. Further, it is also possible to configure the communications I/F 1005 to be able to transmit and receive a signal, have the processing program received by the communications I/F 1005 from the external storage through the channel, store it in the RAM 1003 or the external storage 1004, and execute it at the CPU 1001.

That is, the transmitter 1 may introduce the computer program for the above processing for processing at the CPU 1001 through not only a medium comprised of a magnetic disk, CD-ROM, or other information storage medium, but also the Internet, digital satellite, or other transmission medium.

An explanation will be given, using FIG. 39, of the hardware configuration of the receiver 1 in the case of decoding processing explained using FIG. 1 to FIG. 37 by software.

In FIG. 39, the receiver 7 is provided with a CPU (central processing unit) 2001 for executing a processing program, a ROM (read only memory) 2002 storing a processing program for processing in accordance with a decoding routine explained using FIG. 1 to FIG. 37, a RAM (random access memory) 2003 temporarily storing processing data, an external storage 2004 storing data to be decoded, that is, decoding information 10, and a communications I/F (interface) 2005 for receiving an I-signal and Q-signal from the transmitter 1 through the channel 6. Further, it is provided with a path 2006 connected to the circuits for transmission of the program or data.

The external storage 2004 is a randomly accessible information storage medium such as a magnetic disk or optical disk.

Note that the processing program of the present embodiment is stored in the ROM 2002 in this configuration, but it is also possible to have it stored in an external storage 2004 and to transfer it through the bus 2006 to the RAM 2003 at the time of execution and execute it by the CPU 2001. Further, it is also possible to configure the communications I/F 2005 to be able to transmit and receive a signal, have the processing program received by the communications I/F 2005 from the external storage through the channel, store it in the RAM 2003 or the external storage 2004, and execute it at the CPU 2001.

That is, the receiver 7 may introduce the computer program for the above processing for processing at the CPU 2001 through not only a medium comprised of a magnetic disk, CD-ROM, or other information storage medium, but also the Internet, digital satellite, or other transmission medium.

As explained above, according to the above embodiment using the error rate estimating device, the error rate estimating method, and the medium of the present invention, since the number of times of normalization performed when generating a state metric is counted within a predetermined time and the error rate of a signal is estimated by the counted number of times of normalization, the device for estimating the error rate of the signal can be made smaller in configuration and can perform processing at a high speed.

Further, according to the above embodiment using the error rate estimating device, the error rate estimating method, and the medium of the present invention, since the number of times of normalization performed when generating a state metric is counted for each of a plurality of transmission systems or coding rates and the error rate for each signal is estimated by the counted number of times of normalization, the device for estimating the error rate of the signal can be made smaller in configuration and can perform processing at a high speed.

Further, according to the above embodiment utilizing the error rate estimating device, error rate estimating method, and medium of the present invention, since the number of times of normalization performed when generating a state metric is counted for each of a plurality of transmission systems or coding rates, the error rate for each signal is estimated by the counted number of times of normalization, a value to be multiplied with an error rate for each signal is determined in accordance with the value of the error rate estimated by the estimating means for a predetermined transmission system or coding rate and multiplied, and the value is added and output, the device for estimating the error rate of the signal can be made smaller in configuration and can perform processing at a high speed.

INDUSTRIAL APPLICABILITY

The error rate estimating device and the error rate estimating method of the present invention may be applied to various apparatuses for transmitting signals.

What is claimed is:

1. An error rate estimating device for estimating an error rate of a signal when decoding a signal modulated by a plurality of transmission systems or coding rates,
    said error rate estimating device provided with:
    a judging means for judging a transmission system or coding rate of the signal;
    a counting means for counting a number of times normalization is performed in a predetermined time period for each of the plurality of transmission systems or coding rates;
    state metric calculating means for calculating a state metric,
    wherein normalization is being performed while said state metric is being calculated;
    an estimating means for estimating the error rate for each signal from the correspondence between the number of times of normalization and the error rate respectively determined for each different transmission system or each different coding rate based on the number of times of normalization counted by the counting means; and
    a selecting means for selecting one of a plurality of error rates for each signal estimated by the estimating means.

2. An error rate estimating device as set forth in claim 1, wherein said selecting means selects the error rate according to the transmission system or the coding rate judged by the judging means.

3. An error rate estimating device as set forth in claim 1, wherein the selecting means selects an error rate to be output by comparing a plurality of error rates input with a predetermined reference value.

4. An error rate estimating method for estimating an error rate of a signal when decoding a signal modulated by a plurality of transmission systems or coding rates, said error rate estimating method comprising:
   a judging step of judging a transmission system or coding rate of the signal;
   a counting step of counting a number of times normalization is performed in a predetermined time period, for each of the plurality of transmission systems or coding rates;
   a state metric calculating step for calculating a state metric for each of the plurality of transmission systems or coding rates,
   wherein normalization is being performed while said state metric is being calculated;
   an estimating step of estimating the error rate for each signal from each of the plurality of transmission systems or coding rates using the number of times normalization is performed; and
   a selecting step of selecting one of a plurality of error rates for each signal estimated in the estimating step.

5. An error rate estimating method as set forth in claim 4, further comprising, in said selecting step, selecting the error rate according to the transmission system or the coding rate judged by the judging step.

6. An error rate estimating method as set forth in claim 4, further comprising, in said selecting step, selecting an error rate to be output by comparing a plurality of error rates input with a predetermined reference value.

7. An information recording medium for providing information for control executed by a receiver receiving a signal modulated by a plurality of transmission systems or coding rates sent through a channel, wherein said control information includes:
   a judgment instruction for judging a transmission system or coding rate of the signal;
   a count instruction for counting a number of times normalization is performed in a predetermined time period;
   a calculation instruction for calculating a state metric;
   wherein normalization is being performed while said state metric is being calculated;
   an estimation instruction for estimating the error rate of the signal using the number of times normalization is performed; and
   a selection instruction for selecting one of a plurality of error rates for each signal estimated in the estimating step.

8. An error rate estimating device for estimating an error rate of a signal when decoding a signal modulated by a plurality of transmission systems or coding rates,
   said error rate estimating device comprising:
   a counting means for counting a number of times normalization is performed in a predetermined time period, for each of the plurality of transmission systems or coding rates;
   state metric calculating means for calculating a state metric,
   wherein normalization is being performed while said state metric is being calculated;
   an estimating means for estimating the error rate for each signal from each of the plurality of transmission systems or coding rates using the number of times normalization is performed;
   a multiplying means for determining a value for multiplication with the error rate for each signal according to a value of the error rate estimated by the estimating means for a predetermined transmission system or coding rate among the transmission systems or coding rates and multiplying with that value; and
   an outputting means for adding and outputting the error rate for each signal output from the multiplying means.

9. An error rate estimating method for estimating an error rate of a signal when decoding a signal modulated by a plurality of transmission systems or coding rates,
   said error rate estimating method comprising:
   a counting step of counting the number of times normalization is performed in a predetermined time period, for each of the plurality of transmission systems or coding rates;
   a state metric calculating step for calculating a state metric for each of the plurality of transmission systems or coding rates,
   wherein normalization is being performed while said state metric is being calculated;
   an estimating step of estimating the error rate for each signal from each of the plurality of transmission systems or coding rates using the number of times normalization is performed;
   a multiplying step of determining a value for multiplication with the error rate for each signal according to a value of the error rate estimated by the estimating step for a predetermined transmission system or coding rate among the transmission systems or coding rates and multiplying with that value; and
   an outputting step of adding and outputting the error rate for each signal output in the multiplying step.

10. An information recording medium for providing information for control executed by a receiver receiving and decoding a signal modulated by a plurality of transmission systems or coding rates sent through a channel,
    said control information including:
    a count instruction for counting a number of times normalization is performed, for each of the plurality of transmission systems or coding rates;
    a calculation instruction for calculating a state metric,
    wherein normalization is being performed while said state metric is being calculated;
    an estimation instruction for estimating the error rate for each signal using the number of times normalization is performed;
    a multiplication instruction for determining a value for multiplication with the error rate for each signal according to a value of the error rate estimated by the estimating step for a predetermined transmission system or coding rate among the transmission systems or coding rates and multiplying with that value; and
    an output instruction for adding and outputting the error rate for rach signal output from the multiplying step.

* * * * *